US012701376B2

(12) United States Patent
Kim et al.

(10) Patent No.: US 12,701,376 B2
(45) Date of Patent: Aug. 4, 2026

(54) VEHICLE EQUIPPED WITH SOUND CONTROL DEVICE

(71) Applicant: LG ELECTRONICS INC., Seoul (KR)

(72) Inventors: Jongkun Kim, Seoul (KR); Joonil Lee, Seoul (KR); Gunho Song, Seoul (KR); Kichul Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 104 days.

(21) Appl. No.: 18/845,562

(22) PCT Filed: Oct. 12, 2022

(86) PCT No.: PCT/KR2022/015413
§ 371 (c)(1),
(2) Date: Sep. 10, 2024

(87) PCT Pub. No.: WO2023/191211
PCT Pub. Date: Oct. 5, 2023

(65) Prior Publication Data
US 2025/0193619 A1     Jun. 12, 2025

(30) Foreign Application Priority Data

Mar. 30, 2022    (KR) ........................ 10-2022-0039899

(51) Int. Cl.
| | |
|---|---|
| *H04S 7/00* | (2006.01) |
| *G06F 3/16* | (2006.01) |
| *G06V 20/58* | (2022.01) |

(52) U.S. Cl.
CPC ................ *H04S 7/30* (2013.01); *G06F 3/165* (2013.01); *G06V 20/58* (2022.01); *H04R 2499/13* (2013.01); *H04S 2400/11* (2013.01)

(58) Field of Classification Search
CPC .... H04S 7/30; H04S 2499/13; H04S 2400/11; H04S 2400/13; G06F 3/165; G06F 3/167
See application file for complete search history.

(56) References Cited

U.S. PATENT DOCUMENTS 11,516,613 B1 *  11/2022  Chebiyyam .......... G05D 1/0088
2017/0021768 A1   1/2017  Jaegal et al.
(Continued)

FOREIGN PATENT DOCUMENTS

| JP | 2013223031 | 10/2013 |
|---|---|---|
| KR | 10-1421793 | 7/2014 |

(Continued)

OTHER PUBLICATIONS

PCT International Application No. PCT/KR2022/015413, International Search Report dated Jan. 16, 2023, 4 pages.
(Continued)

*Primary Examiner* — David L Ton
(74) *Attorney, Agent, or Firm* — LEE, HONG, DEGERMAN, KANG & WAIMEY

(57) ABSTRACT

The present invention provides a vehicle comprising a sound control device. A sound control device, according to one embodiment of the present invention, comprises: a sound object extraction module that extracts at least one audio object from an audio signal received from at least one of an outdoor microphone provided outside a vehicle and an indoor microphone provided inside the vehicle; and a sound object renderer that performs rendering with an audio function by using the audio object signal extracted by the sound object extraction module.

10 Claims, 20 Drawing Sheets

(56) References Cited

U.S. PATENT DOCUMENTS

| | | | |
|---|---|---|---|
| 2019/0258878 A1 | 8/2019 | Koivisto et al. | |
| 2020/0204966 A1 | 6/2020 | Thagadur Shivappa et al. | |
| 2020/0401372 A1 | 12/2020 | Vilermo et al. | |
| 2022/0272448 A1* | 8/2022 | Rajkumar | H04R 1/08 |
| 2022/0279276 A1* | 9/2022 | Robinson | H04R 3/12 |

FOREIGN PATENT DOCUMENTS

| | | |
|---|---|---|
| KR | 10-1516644 | 5/2015 |
| KR | 10-2018-0050652 | 5/2018 |
| KR | 10-1977090 | 5/2019 |
| KR | 10-2021-0129583 | 10/2021 |
| WO | 2020-031696 | 2/2020 |
| WO | 2021-050542 | 3/2021 |

OTHER PUBLICATIONS

European Patent Office Application Serial No. 22935885.8, Search Report dated Jun. 2, 2025, 7 pages.
European Patent Office Application Serial No. 22935884.1, Search Report dated Jun. 4, 2025, 7 pages.
Korean Intellectual Property Office Application No. 10-2024-7019829, Office Action dated Jan. 12, 2026, 7 pages.
Korean Intellectual Property Office Application No. 10-2024-7019828, Office Action dated May 11, 2026, 10 pages.

* cited by examiner

HEIGHT
DIRECTION(H)

WIDTH
DIRECTION(W)

OVERALL-LENGTH
DIRECTION(L)

VEHICLE EQUIPPED WITH SOUND CONTROL DEVICE

CROSS-REFERENCE TO RELATED APPLICATIONS

This application is the National Stage filing under 35 U.S.C. 371 of International Application No. PCT/KR2022/015413, filed on Oct. 12, 2022, which claims the benefit of earlier filing date and right of priority to Korean Application No. 10-2022-0039899, filed on Mar. 30, 2022, the contents of which are all hereby incorporated by reference herein in their entireties.

TECHNICAL FIELD

The present disclosure relates to a vehicle equipped with a sound control device.

BACKGROUND ART

A vehicle is an apparatus that moves in a direction desired by a user on board. A representative example of a vehicle may be an automobile.

Meanwhile, for convenience of a user using a vehicle, various types of sensors and electronic devices are provided in the vehicle. Specifically, a study on an advanced driver assistance system (ADAS) is actively undergoing. In addition, an autonomous vehicle is actively under development.

In recent years, progress has been actively made in sound control developments due to many elements that generate sound in a vehicle. The objective of the developments is to effectively deliver these elements to a user present inside or outside the vehicle, thereby improving safety during vehicle travel and contributing to the provision of optimized information.

In the related art, in a case where various internal or external sounds are generated on a per-individual object basis, sound objects have not been controlled or used in a distinguished manner.

In addition, at the level of the related art, a risk situation is simply determined based on the sound generated in the vicinity of the vehicle, and accordingly, a warning sound is externally output in the direction in which the sound is generated.

DISCLOSURE OF INVENTION

Technical Problem

In order to address the above-mentioned problems, one object of the present disclosure is to provide a vehicle equipped with a sound control device capable of outputting optimal audio suitable for a situation.

Another object of the present disclosure is to provide a user interface capable of extracting objects from an audio signal and adjusting an audio object according to a situation.

Solution to Problem

In order to accomplish the above-mentioned objects, according to one aspect of the present disclosure, there is provided a sound control device including: a sound object extraction module configured to extract at least one audio object from an audio signal received from at least one of the following: an outdoor microphone provided on the outside of a vehicle or an indoor microphone provided inside the vehicle; and a sound object renderer configured to render the at least one audio object extracted in the sound object extraction module into audio functions.

In an embodiment, in the sound control device, the sound object extraction module may include: a feature embedding module configured to extract a feature vector of the audio object; a feature extraction module configured to extract features to be used as input into a deep neural network; and a synthesizer configured to synthesize an audio signal using a result value predicted from the features input to the deep neural network.

In an embodiment, in the sound control device, the sound object extraction module may further include a separation module configured to separate a specific object from an original signal, using information extracted in the feature embedding module and an input feature.

In an embodiment, in the sound control device, the separation module may separate different types of objects according to a type of the feature vector input in the feature embedding module.

In an embodiment, in the sound control device, the feature extraction module may learn weights of the deep neural network using predefined input data and output data.

In an embodiment, in the sound control device, the feature extraction module may extract the features using at least one of the following: a time domain technique or a frequency domain technique.

In an embodiment, in the sound control device, the time domain technique may extract the features by altering a sampling rate value of an input signal through up-sampling or down-sampling.

In an embodiment, in the sound control device, the frequency domain technique may perform conversion into a frequency domain signal by performing a Short-Time Fourier Transform (STFT) and may extract the features using a frequency band based on a person's hearing characteristics.

In an embodiment, in the sound control device, the sound object renderer may include: a voice normalizer configured to normalize voice to a target magnitude; an auto volume module configured to normalize a magnitude of an original sound signal to a target magnitude; and a voice mixer configured to mix a voice signal, resulting from the normalization in the voice normalizer, with a sound signal, resulting from the normalization in the auto volume module.

In an embodiment, in the sound control device, the voice normalizer may include: a perceptual weighting filter configured to delete a band unrelated to the voice signal and to emphasize a band of a person's voice signal; a pre-processing module configured to extract data for calculating a gain from the voice signal in each frequency band; a power estimation module configured to estimate average power of the voice over a predetermined time; a gain calculation module configured to calculate a gain using the estimated average power of the voice and the target magnitude of the voice; and a gain application module configured to acquire the voice signal having magnitude resulting from normalization by multiplying the voice signal by the calculated gain.

In order to accomplish the above-mentioned objects, according to another aspect of the present disclosure, there is provided a sound control device including: a sound object extraction module configured to extract at least one audio object from an audio signal received from at least one of the following: an outdoor microphone provided on the outside of a vehicle or an indoor microphone provided inside the vehicle; a sound object renderer configured to render the at least one audio object extracted in the sound object extraction module into audio functions; a genre recognizer configured to analyze the received audio signal, categorize the analyzed audio signal into genres, and generate a probability value for each genre; a volume measurement unit configured to measure the magnitude of each of the audio objects extracted in the sound object extraction module and visualize the measured magnitudes of the audio objects; and a volume control unit configured to apply different volumes to the audio objects, based on the genres, resulting from the categorization in the genre recognizer.

In an embodiment, in the sound control device, the volume control unit may generate a user interface capable of controlling volume of each extracted audio object.

In an embodiment, in the sound control device, the audio object may include a voice object, a music object, and an effect sound object.

In an embodiment, in the sound control device, the volume control unit may provide a plurality of modes, and the audio objects may be set to different volumes in each of the plurality of modes.

In an embodiment, in the sound control device, the sound object renderer may generate sound object context information based on at least one of the following: a direction, an attribute, or a feature of sound for each extracted audio object.

In an embodiment, in the sound control device, the volume measurement unit may include a sound object visualization module generating a graphic object corresponding to the audio object, using the sound object context information and output the graphic object generated in the sound object visualization module to a display of the vehicle.

In an embodiment, in the sound control device, when the graphic object is selected, the volume control unit may generate an audio augmentation scenario for an audio object corresponding to the graphic object.

In an embodiment, in the sound control device, the audio augmentation scenario may be formed by setting at least one of the following: an object category, an object attribute, a drive function, or a type of sound stream to be processed.

In an embodiment, in the sound control device, the volume control unit may augment a sound effect corresponding to the audio augmentation scenario based on the audio augmentation scenario.

In an embodiment, in the sound control device, in a case where a source of the audio signal is unidentified from an image received through a camera, the volume control unit may output a graphic object, visualized in such a manner that the source of the audio signal is identifiable, on a display of the vehicle.

In an embodiment, in the sound control device, when outputting a guidance sound or an advertisement for a place of interest from an infotainment system included in the vehicle, the volume control unit may control speakers of the vehicle in such a manner that sound is output through a speaker positioned at a place corresponding to a location of the place of interest.

In an embodiment, in the sound control device, when it is detected that a driver of the vehicle sings along with music being output in the vehicle, the volume control unit may reduce vocal sound in the music, apply an audio effect to the driver's voice, and output the resulting driver's voice through speakers.

In an embodiment, in the sound control device, in a state where music is played in the vehicle, in a case where navigation path guidance is output, the volume control unit may reduce vocal sound in the music being played and increase volume of the navigation path guidance.

In an embodiment, in the sound control device, the volume control unit may receive, from the vehicle, information on whether or not the vehicle deviates to the left or the right from a lane along which the vehicle travels, and vary left and right volume balance of sound, which is output through speakers of the vehicle, based on a direction toward which the vehicle deviates.

The details of other embodiments are included in the following detailed description and the accompanying drawings.

Advantageous Effects of Invention

According to embodiments of the present disclosure, one or more effects can be achieved as follows.

Firstly, according to the present disclosure, there can be provided a novel sound control device capable of recognizing sound inside and outside a vehicle as units of individual objects and controlling them independently and a method of controlling the novel sound control device.

Secondly, according to the present disclosure, there can be an intuitively visualized interface that helps a user understand a situation quickly and perform control intuitively.

Thirdly, according to the present disclosure, by coupling various sensors to the vehicle, a situation associated with sound inside and outside the vehicle's cabin can be determined, and control scenarios can be managed.

Fourthly, according to the present disclosure, an augmentation-type user experience (UX) that is different from the existing one can be provided by reprocessing and optimizing indoor output sound.

Fifthly, according to the present disclosure, in the vehicle's operating environment, many internal or external sounds can be controlled at an individual object level, thereby providing an optimized augmented sound experiment.

The effects of the present disclosure may not be limited to those effects mentioned above, and other effects not mentioned may be clearly understood by those skilled in the art from the description of the appended claims.

BRIEF DESCRIPTION OF DRAWINGS

FIG. 16 is a conceptual diagram referenced to describe an AI-based vehicular augmentation sound system according to an embodiment of the present disclosure.

MODE FOR THE INVENTION

Description will now be given in detail according to embodiments disclosed herein, with reference to the accompanying drawings, and the same or like components may be given the same or like reference numbers, and description thereof will be omitted. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation will be omitted. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present disclosure may be understood as a conception including automobiles, motorcycles and the like. Hereinafter, the vehicle will be described based on an automobile.

The vehicle according to the embodiment of the present disclosure may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
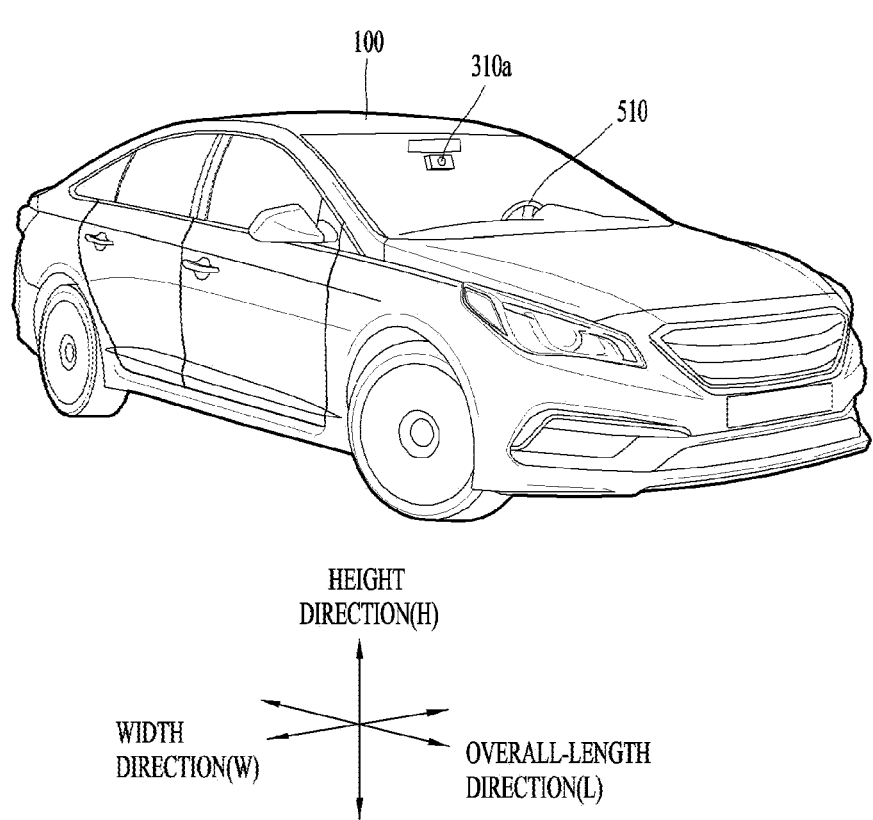
FIG. 1 is a view illustrating appearance of a vehicle in accordance with an embodiment of the present disclosure.

FIG. 1 is a view illustrating appearance of a vehicle in accordance with an embodiment of the present disclosure.

Figure 2:
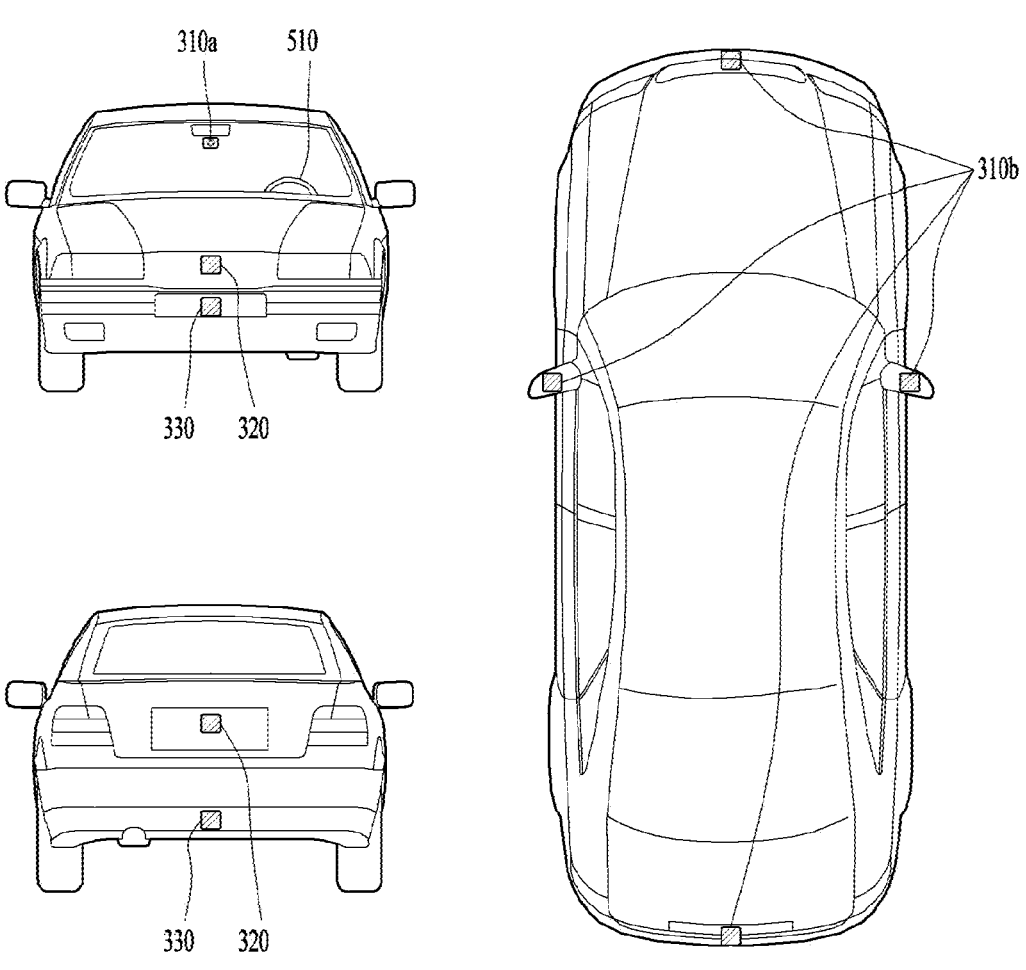
FIG. 2 is a diagram illustrating appearance of a vehicle at various angles in accordance with an embodiment of the present disclosure.

FIG. 2 is a diagram illustrating appearance of a vehicle at various angles in accordance with an embodiment of the present disclosure.

Figure 3:
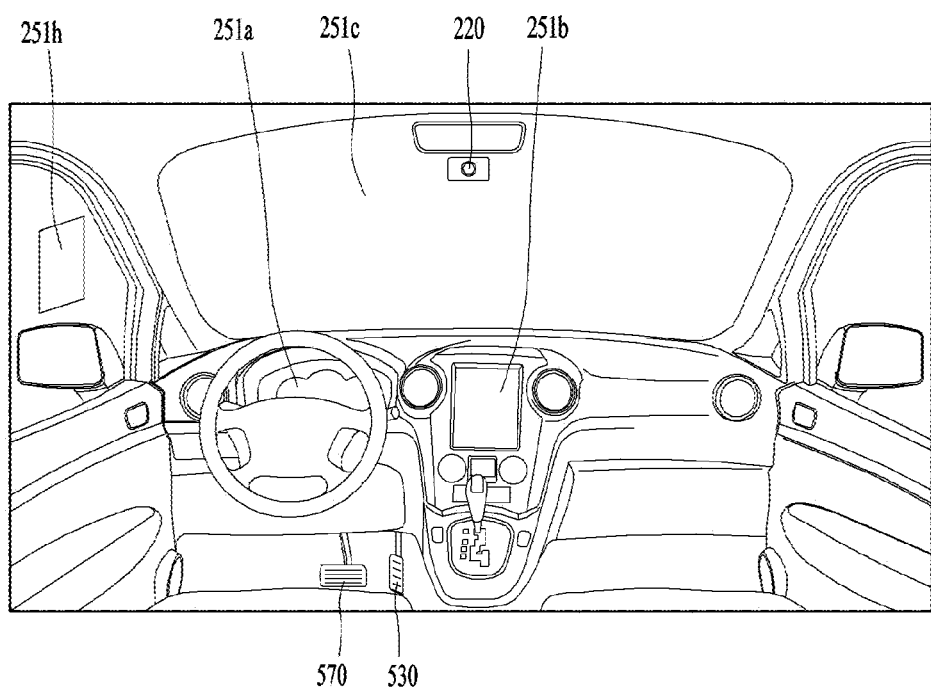
FIGS. 3 and 4 are diagrams illustrating the inside of a vehicle in accordance with an embodiment of the present disclosure.
Figure 4:
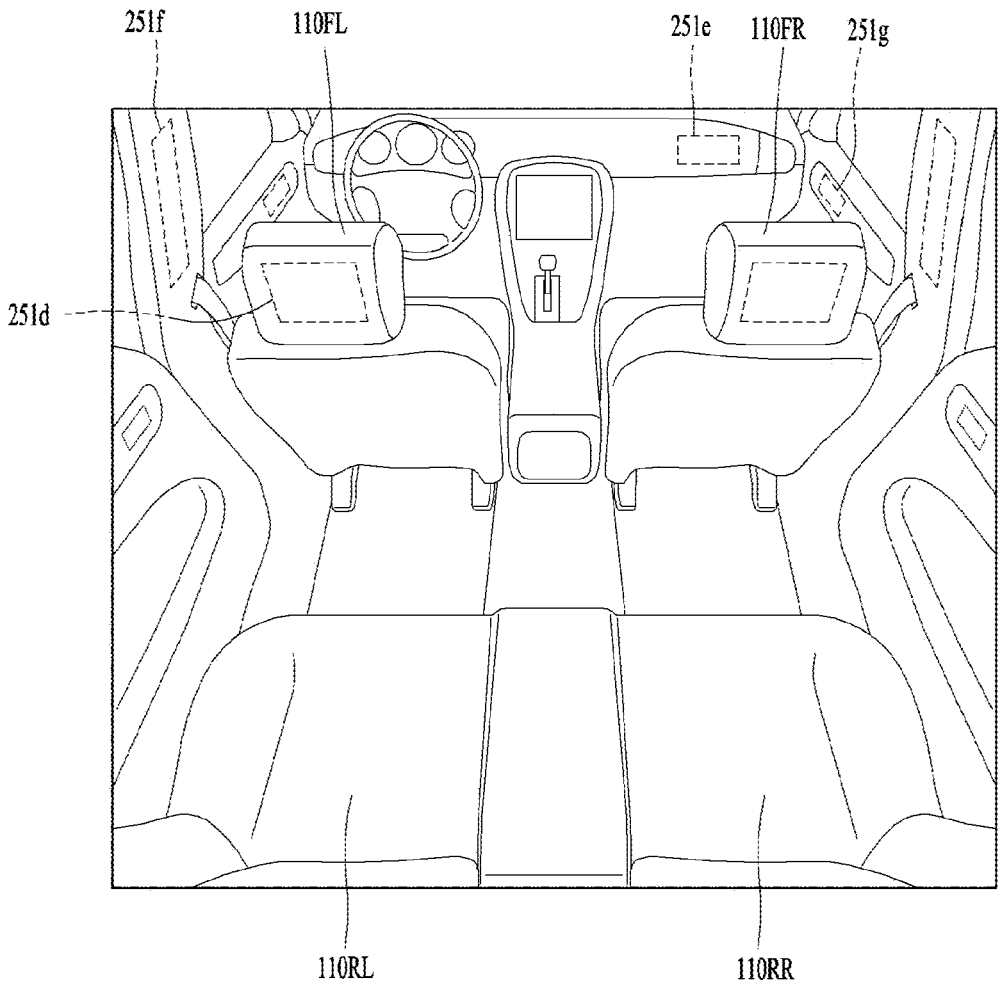

FIGS. 3 and 4 are diagrams illustrating the inside of a vehicle in accordance with an embodiment of the present disclosure.

Figure 5:
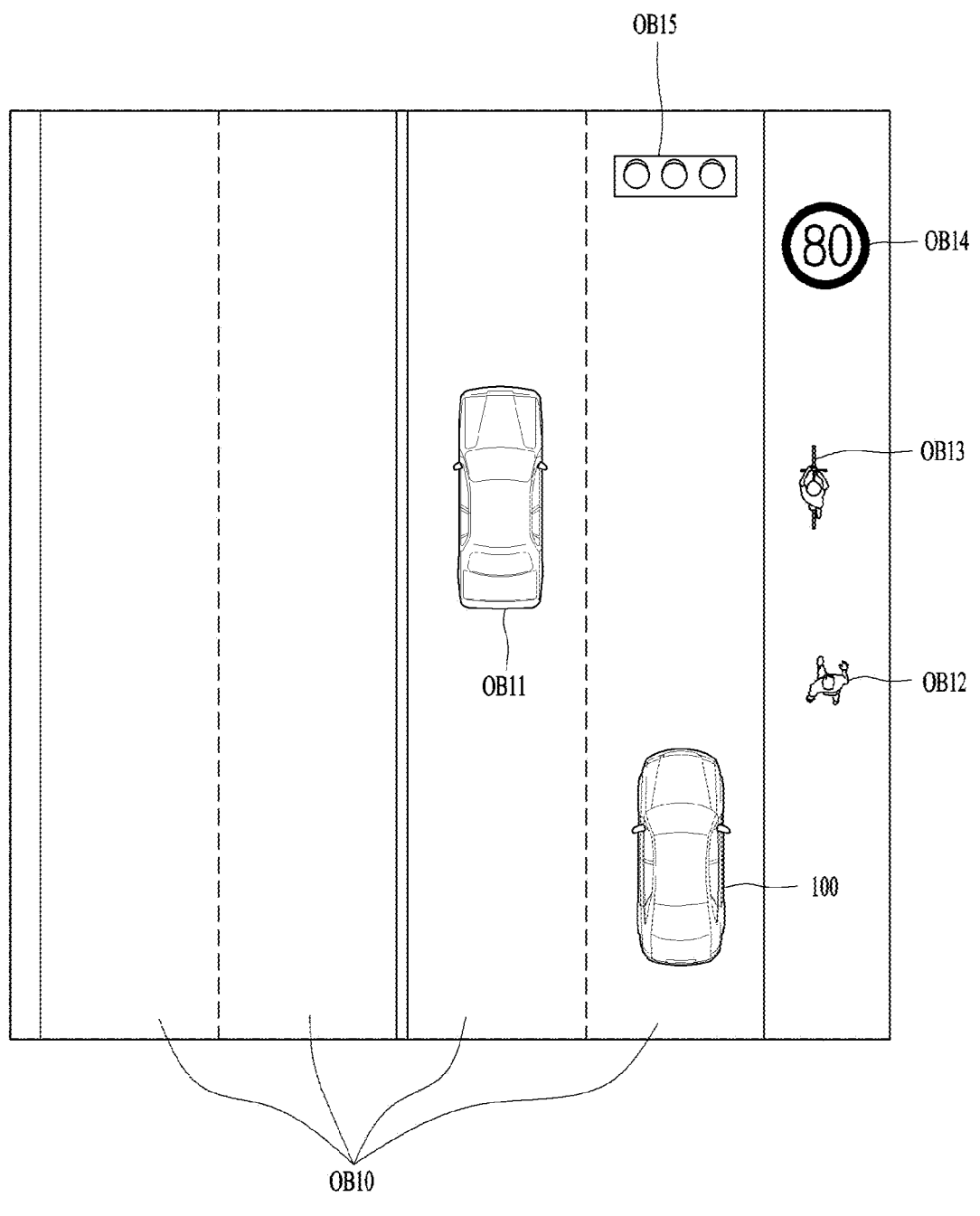
FIGS. 5 and 6 are diagrams illustrating objects in accordance with an embodiment of the present disclosure.
Figure 6:
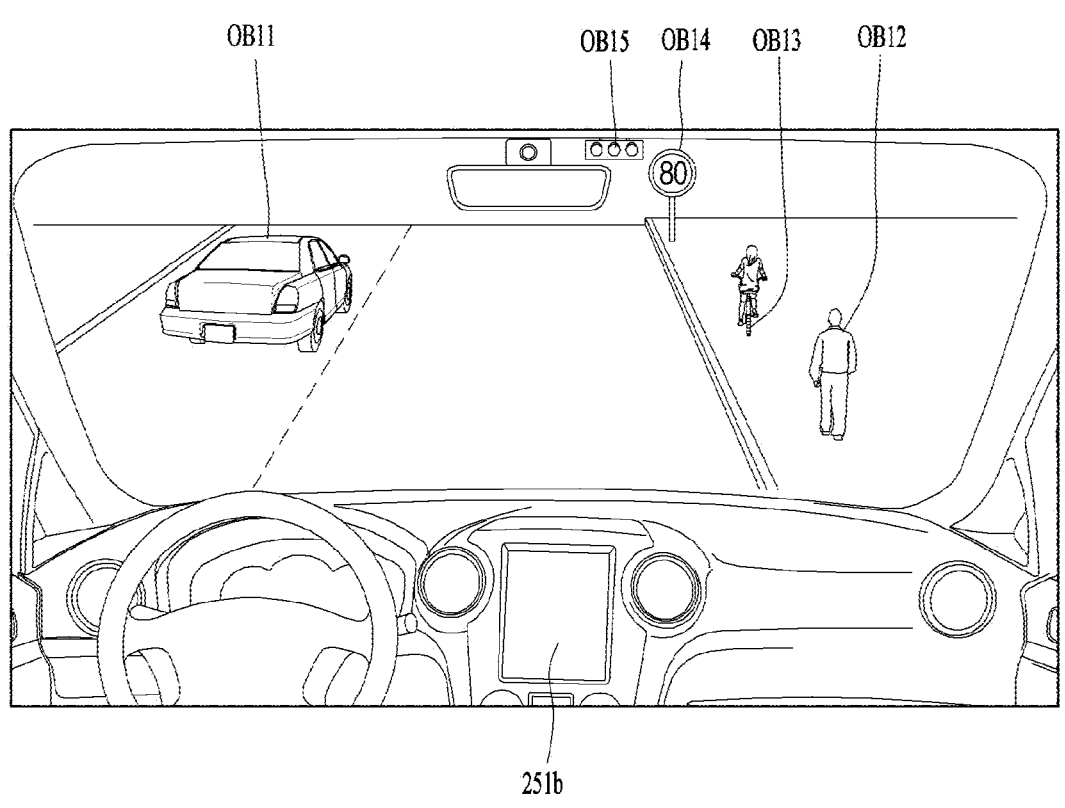

FIGS. 5 and 6 are diagrams illustrating objects in accordance with an embodiment of the present disclosure.

Figure 7:
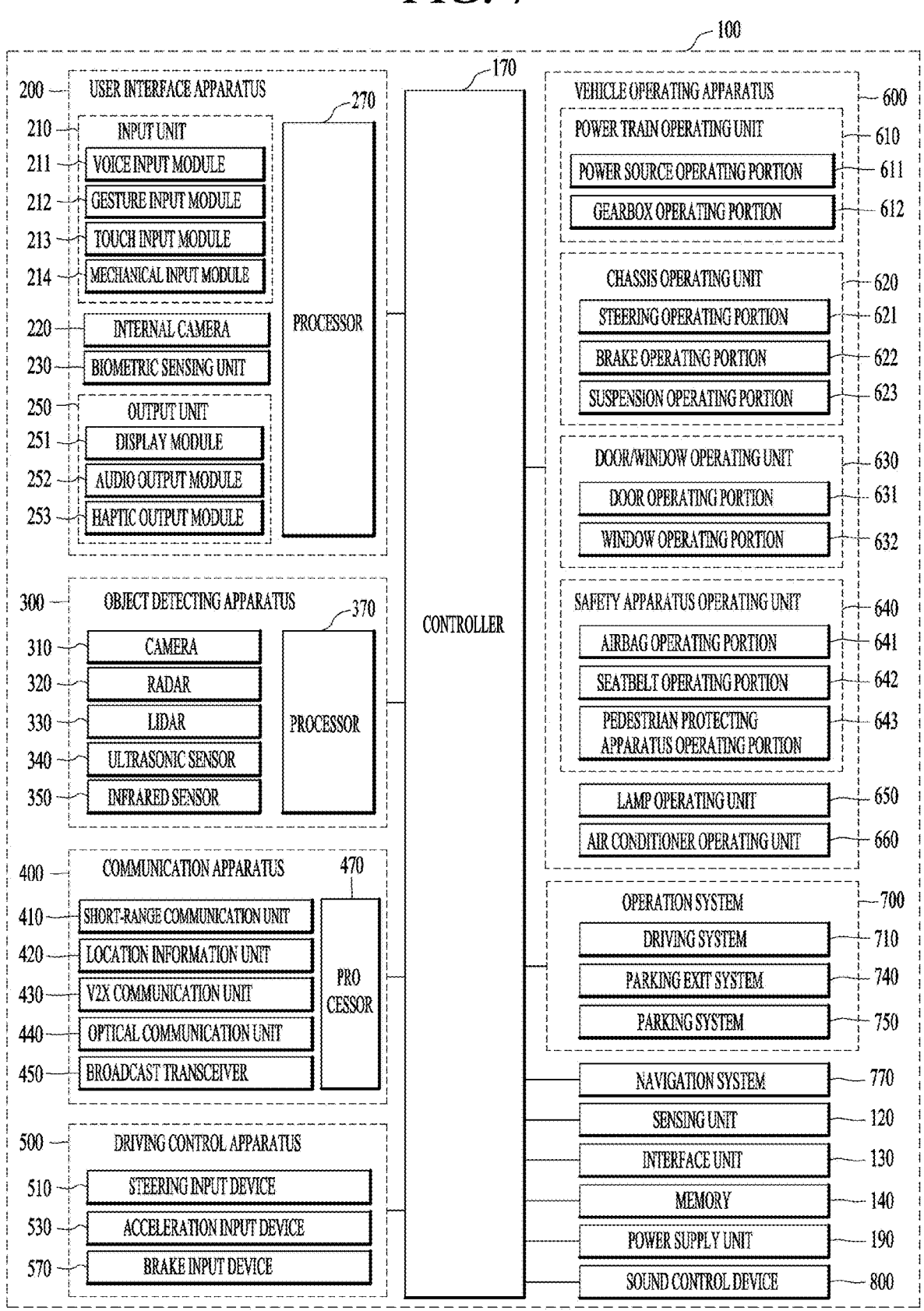
FIG. 7 is a block diagram referenced to describe a vehicle in accordance with an embodiment of the present disclosure.

FIG. 7 is a block diagram referenced to describe a vehicle in accordance with an embodiment of the present disclosure.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be switched from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous mode into the manual mode based on driving environment information generated in the object detecting apparatus 300.

In an example, the vehicle 100 may be switched from the manual mode into the autonomous mode or from the autonomous mode into the manual mode based on driving environment information received through a communication apparatus 400.

The vehicle 100 may be switched from the manual mode into the autonomous mode or from the autonomous module into the manual mode based on information, data, or signal provided from an external device.

When the vehicle 100 is driven in the autonomous mode, the vehicle 100 may be driven based on an operation system 700.

For example, the autonomous vehicle 100 may be driven based on information, data, or signals generated in a driving system 710, a parking exit system 740, and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250 and at least one processor, such as processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 200 may be disposed inside the vehicle. For example, the input unit 200 may be disposed on one region of a steering wheel, one region of an instrument panel, one region of a seat, one region of each pillar, one region of a door, one region of a center console, one region of a headlining, one region of a sun visor, one region of a windshield, one region of a window, or the like.

The input unit 200 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The audio input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing unit 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display, and a transparent LED display. The transparent display may have adjustable transparency.

Meanwhile, the user interface apparatus 200 may include a plurality of display modules 251*a* to 251*g*.

The display module 251 may be disposed on one area of a steering wheel, one area 521*a*, 251*b*, 25*l* of an instrument panel, one area 251*d* of a seat, one area 251*f* of each pillar, one area 251*g* of a door, one area of a center console, one area of a headlining or one area of a sun visor, or implemented on one area 251*c* of a windshield or one area 251*h* of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for a vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB10 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB12 may refer to a vehicle (transportation facility) that is located near the vehicle 100 and moves using two wheels. The two-wheeled vehicle OB12 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a street lamp. The light may be solar light.

The road may include a road surface, a curve, an upward slope, a downward slope and the like.

The structure may be an object that is located near a road and fixed on the ground. For example, the structure may include a street lamp, a roadside tree, a building, an electric pole, a traffic light, a bridge and the like.

The terrain may include a mountain, a hill, and the like.

Meanwhile, objects may be classified into a moving object and a fixed object. For example, the moving object may include another vehicle or a pedestrian. The fixed object may be a concept including a traffic signal, a road and a structure, for example.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310*a*, an around view monitoring (AVM) camera 310*b* or a 360-degree camera.

For example, the camera 310 may be disposed adjacent to a front windshield within the vehicle to acquire a front image of the vehicle. Alternatively, the camera 310 may be disposed adjacent to a front bumper or a radiator grill.

For example, the camera 310 may be disposed of adjacent to a rear glass within the vehicle to acquire a rear image of the vehicle. Alternatively, the camera 310 may be disposed adjacent to a rear bumper, a trunk or a tail gate.

For example, the camera 310 may be disposed adjacent to at least one of side windows within the vehicle to acquire a side image of the vehicle. Alternatively, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect an object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications may include BLUETOOTH, Radio Frequency IDentification (RFID), Infrared Data Association (IrDA), Ultra-Wide-Band (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include an optical transmission part for converting an electric signal into an optical signal and transmitting the optical signal to the outside, and an optical reception part for converting the received optical signal into the electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal, and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to an embodiment, the communication apparatus 600 may further include other components in addition to the components described, or may not include some of the components described.

In some examples, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some examples, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protection apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seat belts upon a detection of a risk.

The pedestrian protection apparatus operating portion 643 may perform an electronic control for a hood lift and a pedestrian airbag. For example, the pedestrian protection apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to an embodiment, the communication apparatus 700 may further include other components in addition to the components described, or may not include some of the components described.

Meanwhile, the operation system 700 may include a processor. Each unit of the operation system 700 may individually include a processor.

According to embodiments, the operation system may be a sub-concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The driving system 750 may receive navigation information from a navigation system 770, transmit a control signal to the vehicle operating apparatus 600, and perform driving of the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub-component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a pose, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. exchange data with the mobile terminal. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub-component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 according to the present disclosure may include a sound control device 800.

The sound control device 800 may control at least one of those components illustrated in FIG. 7. From this perspective, the sound control device 800 may be the controller 170.

Without a limit to this, the sound control device 800 may be a separate device, independent of the controller 170. When the sound control device 800 is implemented as a component independent of the controller 170, the sound control device 800 may be provided on a part of the vehicle 100.

Meanwhile, the sound control device 800 described herein may include all kinds of devices capable of controlling the vehicle, and may be, for example, a mobile terminal. When the sound control device 800 is a mobile terminal, the mobile terminal and the vehicle 100 may be connected to each other so as to perform communication in a wired/wireless manner. In addition, the mobile terminal may control the vehicle 100 in various ways in a communication-connected state.

When the sound control device 800 is a mobile terminal, the processor 870 described herein may be a controller of the mobile terminal.

Hereinafter, description will be given of an example that the sound control device 800 is a component separate from the controller 170 for the sake of explanation. In this specification, functions (operations) and control methods described in relation to the sound control device 800 may be executed by the controller 170 of the vehicle. That is, every detail described in relation to the sound control device 800 may be applied to the controller 170 in the same/like manner.

Also, the sound control device 800 described herein may include some of the components illustrated in FIG. 7 and various components included in the vehicle. For the sake of explanation, the components illustrated in FIG. 7 and the various components included in the vehicle will be described with separate names and reference numbers.

Figure 8:
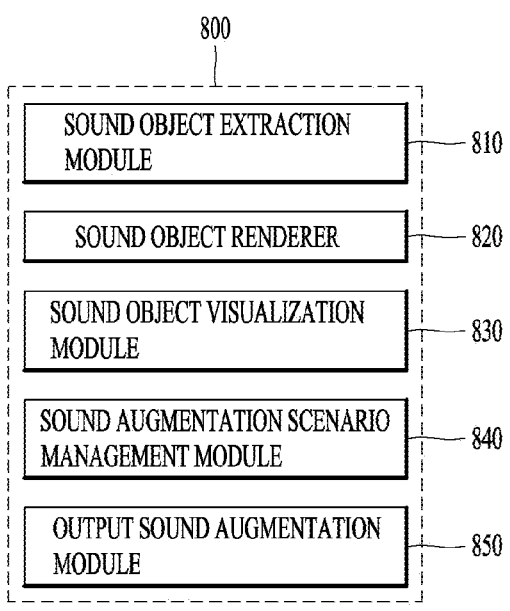
FIG. 8 is a conceptual diagram referenced to describe a sound control device according to the present disclosure.

FIG. 8 is a conceptual diagram referenced to describe the sound control device 800 according to the present disclosure.

The sound control device 800 according to the present disclosure may include: an outdoor microphone provided on the outside of a vehicle; an indoor microphone provided inside the vehicle; a sound object extraction module 810 extracting at least one audio object from an audio signal received from at least one of the following: the outdoor microphone or the indoor microphone; and a sound object renderer 820 rendering the at least one audio object extracted in the sound object extraction module into audio functions.

In addition, the sound control device 800 may include: a sound object visualization module 830 visualizing the extracted audio objects; a sound augmentation scenario management module 840 managing an audio augmentation scenario; and an output sound augmentation module 850 for augmenting output sound.

The sound object visualization module 830 may be included in a volume measurement unit, and the sound augmentation scenario management module 840 and the output sound augmentation module 850 may be included in a volume control unit described below.

Figure 9:
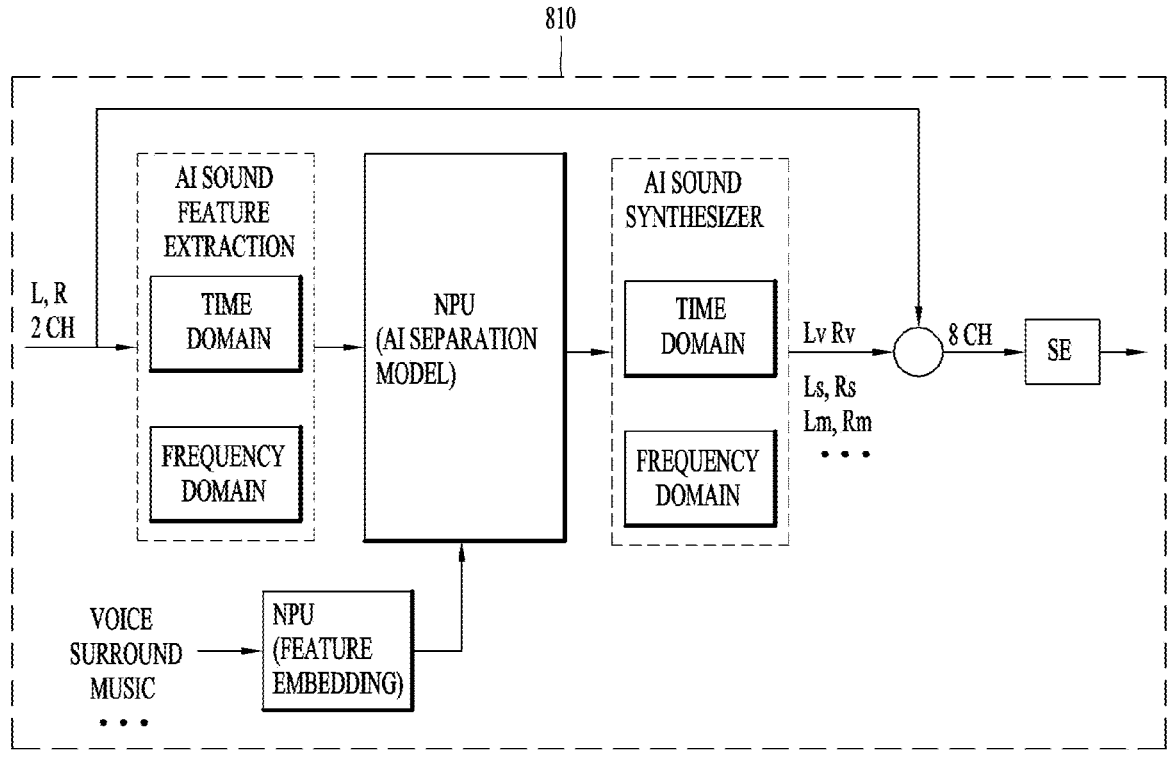
FIG. 9 is a conceptual diagram referenced to describe a sound object extraction module according to the present disclosure.

FIG. 9 is a conceptual diagram referenced to describe the sound object extraction module 810 according to the present disclosure.

According to the present disclosure, objects can be separated (extracted) from a sound signal, and an artificial intelligence (AI) sound function (an AI sound function) based on the separated objects can be provided.

The objects here refer to sound with different attributes included within the audio signal. As an example, the objects may include voice, music, and effect sound (effect).

That is, the audio objects refer to (include) voice, music (or background sound), and effect sound (effect) (such as noise or similar sound).

The sound object extraction module 810 may extract (separate) audio objects (voice, music, effect sound, and the like) from sound received (collected) through the outdoor microphone provided on the outside of the vehicle or the indoor microphone provided inside the vehicle.

The sound object extraction module 810 may be referred to as an Artificial Intelligence Sound Extraction (AISE) module.

The sound object extraction module 810 may extract audio objects from a signal in original stereo channels (L, R 2 ch), which is received through the outdoor or indoor microphone), using a DNN model (Neural Processing Unit (NPU)).

The sound object extraction module 810 may include a feature embedding module (an NPU) extracting a feature vector of an audio object; a feature extraction module (AI sound feature extraction) extracting features to be used as input into a Deep Neural Network (DNN); and a synthesizer (an AI sound synthesizer) synthesizing an audio signal using a result value predicted from the features input to the deep neural network.

The sound object extraction module 810 may further a separation model (an AI separation model (an NPU)) separating a specific object from an original signal (an audio signal), using information extracted in the feature embedding module and an input feature.

The sound object extraction module 810 may be responsible for playing a role in extracting a feature vector of an audio object that is intended to be extracted from an original audio signal.

In a case where a specific object (voice, music, effect sound, or the like) is intended to be separated, the sound object extraction module 810 may extract a feature vector of an object through a feature embedding module and may input the extracted feature vector into the separation module (the AI separation model).

The separation model (the AI separation model) may separate a specific object from an original signal (an audio signal), using the information extracted through the feature embedding module and the input features (or the feature vector).

According to the present disclosure, various types of objects may be separated depending on which object a feature vector to be input through the feature embedding module belongs to.

That is, the separation model (the AI separation model) according to the present disclosure may separate different types of objects according to a type of the feature vector input from the feature embedding module.

The feature extraction module (the AI sound feature extraction) may learn weights of the Deep Neural Network using predefined input data and output data.

The feature extraction module may extract the features using at least one of the following techniques: a time domain technique or a frequency domain technique.

The time domain technique may extract the features by altering a sampling rate value of an input signal through up-sampling or down-sampling.

The frequency domain technique may perform conversion into a frequency domain signal by performing a Short-Time Fourier Transform (STFT). Furthermore, the frequency domain technique may extract the features using a frequency band based on a person's hearing characteristics.

Specifically, the feature extraction module is responsible for extracting features to be used as input to the DNN model.

The DNN model may learn internal weights through predefined input data and output data.

At this point, a process of generating data features by utilizing domain knowledge associated with data in order to enhance the learning performance of the DNN model may be called feature extraction.

Therefore, according to the present disclosure, the technique of extracting features varies depending on which data are learned, and the magnitude of the features also varies.

The feature extraction technique may be broadly categorized into a time domain-based technique and a frequency domain-based technique.

The time domain-based technique extracts features by altering the sampling rate value of the input signal through up-sampling or down-sampling.

The frequency domain-base technique performs conversion into frequency domain signal by performing the STFT and extracts features after incorporating the person's hearing characteristics.

The synthesizer (the AI Sound Synthesizer) may perform synthesis into an audio signal using a result value predicted from features input from the DNN model.

Data flow is as follows. When an audio signal is received, the feature extraction module extracts features and inputs the extracted features into the DNN model. Then, the synthesizer may synthesize audio objects using the features predicted in the DNN model.

This audio signal synthesis technique, like the feature extraction technique, may be categorized into a time domain-based technique and a frequency domain-based technique. The synthesizer may operate in the same domain as the feature extraction module.

Figure 10:
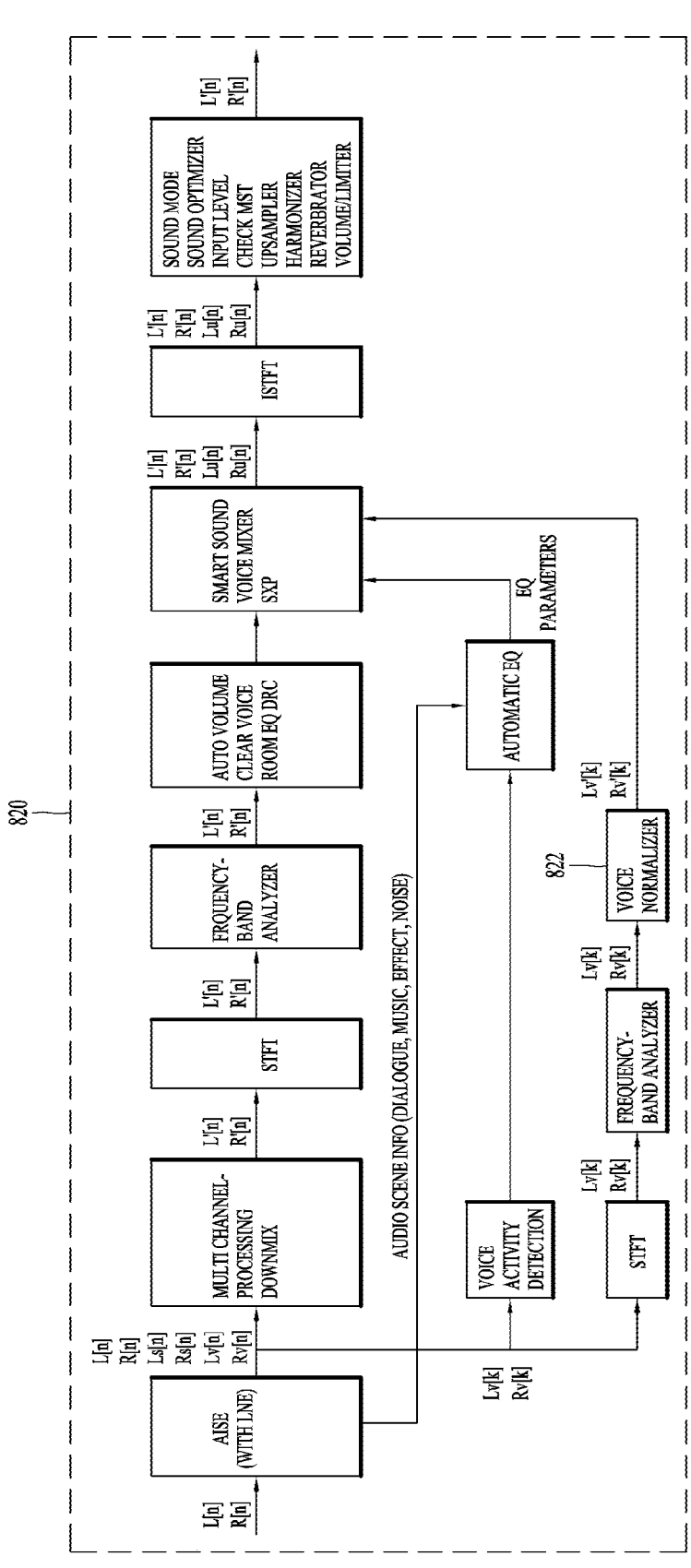
FIG. 10 a conceptual diagram referenced to describe a sound object renderer according to the present disclosure.

FIG. 10 a conceptual diagram referenced to describe the sound object renderer according to the present disclosure.

The sound object renderer 820 may render audio objects (surround, voice, music, effect, and the like) extracted in the sound object extraction module (AISE) into various audio functions.

The sound object renderer may include a voice normalizer normalizing voice to a target magnitude; an auto volume module normalizing the magnitude of an original sound signal to a target magnitude; and a voice mixer mixing a voice signal, resulting from the normalization in the voice normalizer, with a sound signal, resulting from the normalization in the auto volume module.

The voice normalizer may normalize the voice (the voice within an audio object) included in the audio signal to a specific target (a target magnitude).

The auto volume module may normalize an ordinal signal (an audio signal) (or the magnitude of music (background sound)) to a target magnitude (a specific target).

As an example, the auto volume module and the voice normalizer operate in the same structure, but tuning parameters, such as the target magnitude of a signal intended to be normalized, may be applied differently.

An original audio signal is an input to the auto volume module, and an extracted voice signal (a signal corresponding to voice within the audio object) is an input to the voice normalizer.

The voice mixer may mix a signal, to which a spatial effect is applied in the auto volume module, with a signal, resulting from the processing of the extracted voice signal in the voice normalizer.

The voice mixer may apply different weights of two signals when mixing. When voice is important, the voice mixer may adjust the level of voice upward. When background sound is important, the voice mixer may adjust (or mix) the level of background sound downward.

L'[k] and R'[k] illustrated in FIG. 10 may be defined using the following mathematical expressions.

$$L'[k] = \text{avl\_gain\_bgm} * L[k] + \text{avl\_gain\_voice} * Lv[k]$$

$$R'[k] = \text{avl\_gain\_bgm} * R[k] + \text{avl\_gain\_voice} * Rv[k]$$

Figure 11:
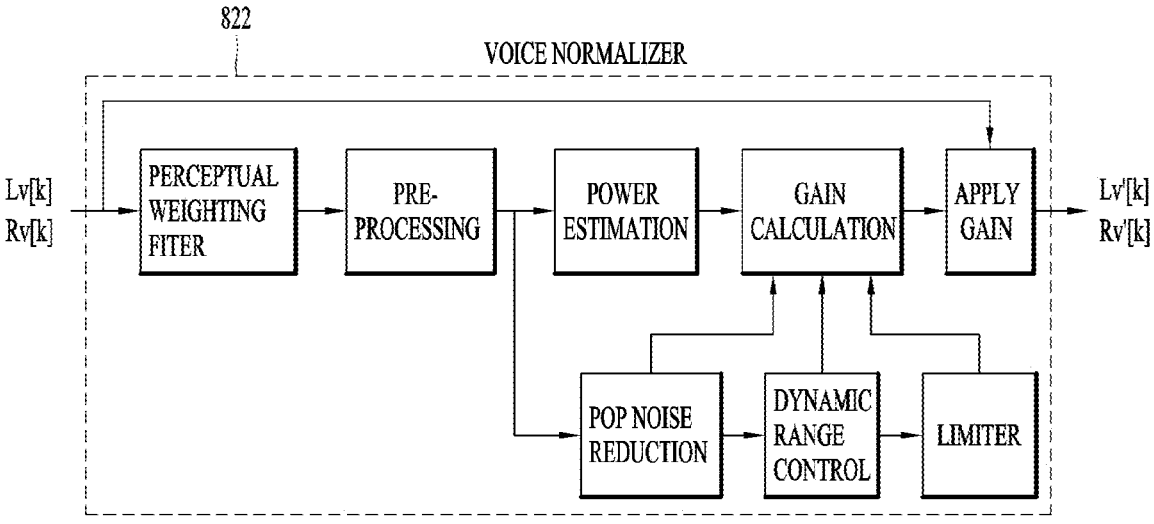
FIG. 11 is a conceptual diagram referenced to describe a voice normalizer according to the present disclosure.

FIG. 11 is a conceptual diagram referenced to describe the voice normalizer according to the present disclosure.

The voice normalizer, as illustrated in FIG. 11, may include: a perceptual weighting filter deleting a band unrelated to a voice signal and emphasizing a band of a person's voice signal; a pre-processing module extracting data for calculating a gain, from a voice signal in each frequency band; a power estimation module estimating the average power of voice over a predetermined time; a gain calculation module calculating a gain using the estimated average power of the voice and a target magnitude of the voice; and a gain application module acquiring the voice signal having magnitude resulting from normalization by multiplying the voice signal by the calculated gain.

The perceptual weighting filter may delete the band unrelated to the voice signal and may emphasize the band of the person's voice signal.

The pre-processing module may extract data, such as power and max_power, for calculating a gain, from the voice signal in each frequency band.

The power estimation module may estimate the extent of the average power of voice over a predetermined time.

The gain calculation module may calculate age gain as follows by comparing the measured voice average power (avg_power) and the voice target magnitude (target_power).

$$agc\_gain = target\_power/avg\_power$$

The final gain may be calculated using the following mathematical expression, which combines agc_gain and values calculated in the following function are put together.

$$avl\_gain = agc\_gain * popnoise\_gain * drc\_gain * limiter\_gain$$

Pop noise reduction means fast attenuation of a high signal occurring over a short time and refers to the value popnoise_gain.

Dynamic range control means adjustment of a dynamic range of the voice signal, and the dynamic range control game (drc_gain) may be calculated using the following mathematical expression.

$$drc\_gain = drc\_target\_power/(avg\_power * agc\_gain * popnoise\_gain)$$

A limiter serves to adjust a magnitude greater than a threshold value down to the threshold value, and the limiter game (limiter gain) may be defined using the following mathematical expression.

$$limiter\_gain =$$

$$limit\_target\_power/(avg\_power * agc\_gain * popnoise\_gain * drc\_gain),$$

$$0 < limiter\_gain < 1$$

Figure 12:
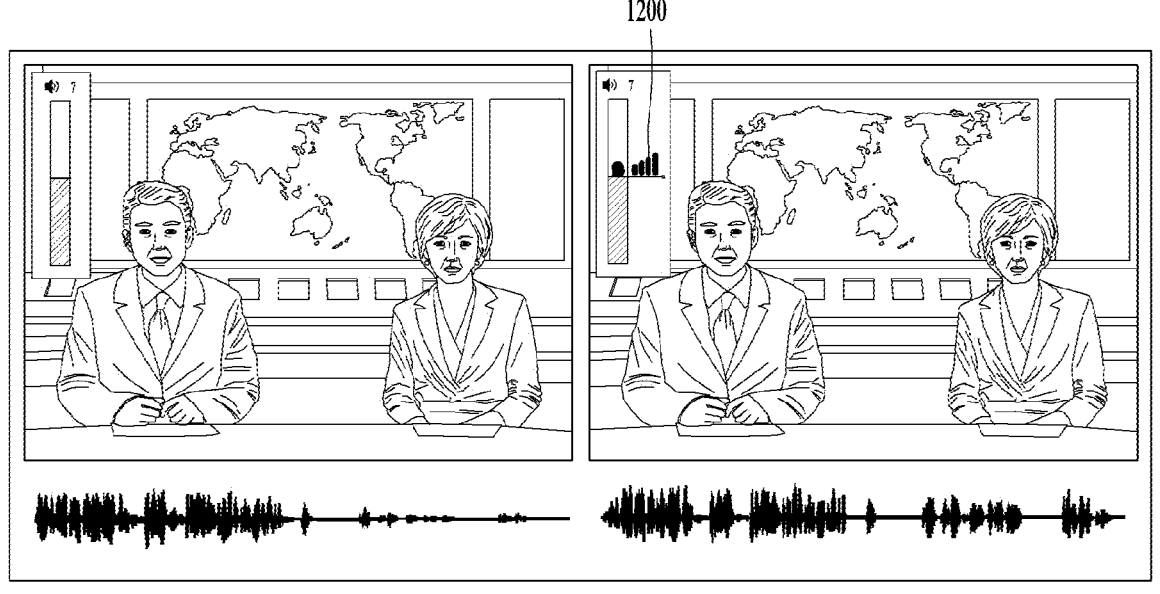
FIGS. 12 and 13 are conceptual diagrams referenced to describe a method, in accordance with an embodiment of the present disclosure, of independently controlling a separated audio object.
Figure 13:
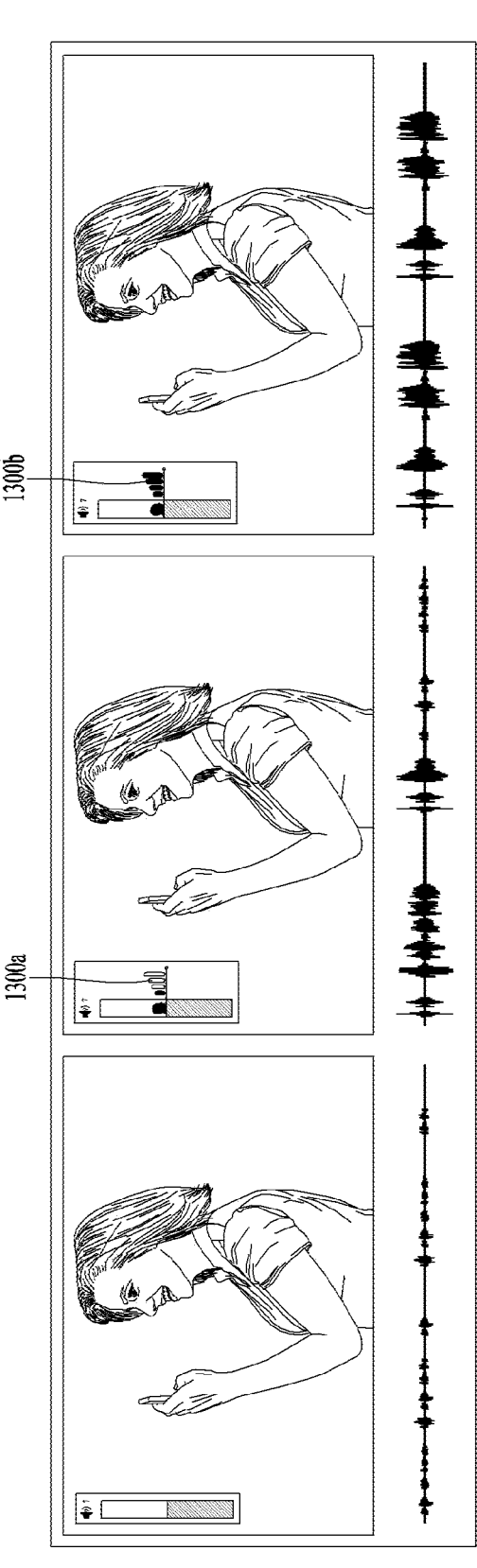

FIGS. 12 and 13 are conceptual diagrams referenced to describe a method, in accordance with an embodiment of the present disclosure, of independently controlling the separated audio object.

A sound control device in accordance with an embodiment of the present disclosure, as illustrated in FIG. 12, may compensate for a voice level difference within a single content item.

For example, in some cases, significant deviations in voice/volume between persons may also occur within the content due to the content creation environment.

At this point, the sound control device according to the present disclosure may extract an audio object having a low voice magnitude and normalize the extracted audio object to a target magnitude, thereby reducing a voice difference between persons.

As an example, when audio objects corresponding to a plurality of persons are detected, the sound control device 800 may generate an icon 1200 for performing normalization of these audio objects and output the generated icon 1200.

When the icon 1200 is selected, the sound control device 800 may normalize the magnitudes of the audio objects, corresponding to the plurality of persons, in the audio signal included in the content, thereby normalizing voice magnitudes between the audio objects.

In addition, the sound control device according to the present disclosure may compensate for voice balance (or voice volume) without causing distortions in the content's background sound.

For example, when a significant deviation occurs between the content's background sound and voice volume, the volume may be adjusted to match the background sound. In this case, the voice may become inaudible. In a case where the volume is adjusted to match the voice, the background may be excessively amplified, leading to inconvenience.

The sound control device according to the present disclosure may extract audio objects and perform compensation (balancing, volume adjustment, or normalization) on these audio independently of each other, thereby normalizing the voice separated from the background sound. Consequently, the sound control device may compensate for voice balance in such a manner that a user can recognize the voice without distortions being caused in the background sound.

The sound control device according to the present disclosure may freely adjust the magnitude of the voice separated from the background sound.

As illustrated in FIG. 13, the sound object extraction module may extract audio objects corresponding to background sound and voice from an audio signal (such as an audio signal received through a microphone or an audio signal from content played on a vehicle infotainment system or a vehicle display) being input. At this point, the sound object extraction module may freely adjust the magnitude of voice within the content by utilizing the voice separated through the DNN model.

For example, the volume control unit of the sound control device may add a voice adjustment volume key 1300*a* to a volume key for adjusting the volume of the existing entire audio content.

At this point, when voice volume increases through the use of the voice adjustment volume key, the volume control unit of the sound control device may increase the volume of a voice object among the audio objects included in the audio signal and may freely adjust only the magnitude of the voice while maintaining the volume of a background sound object.

Figure 14:
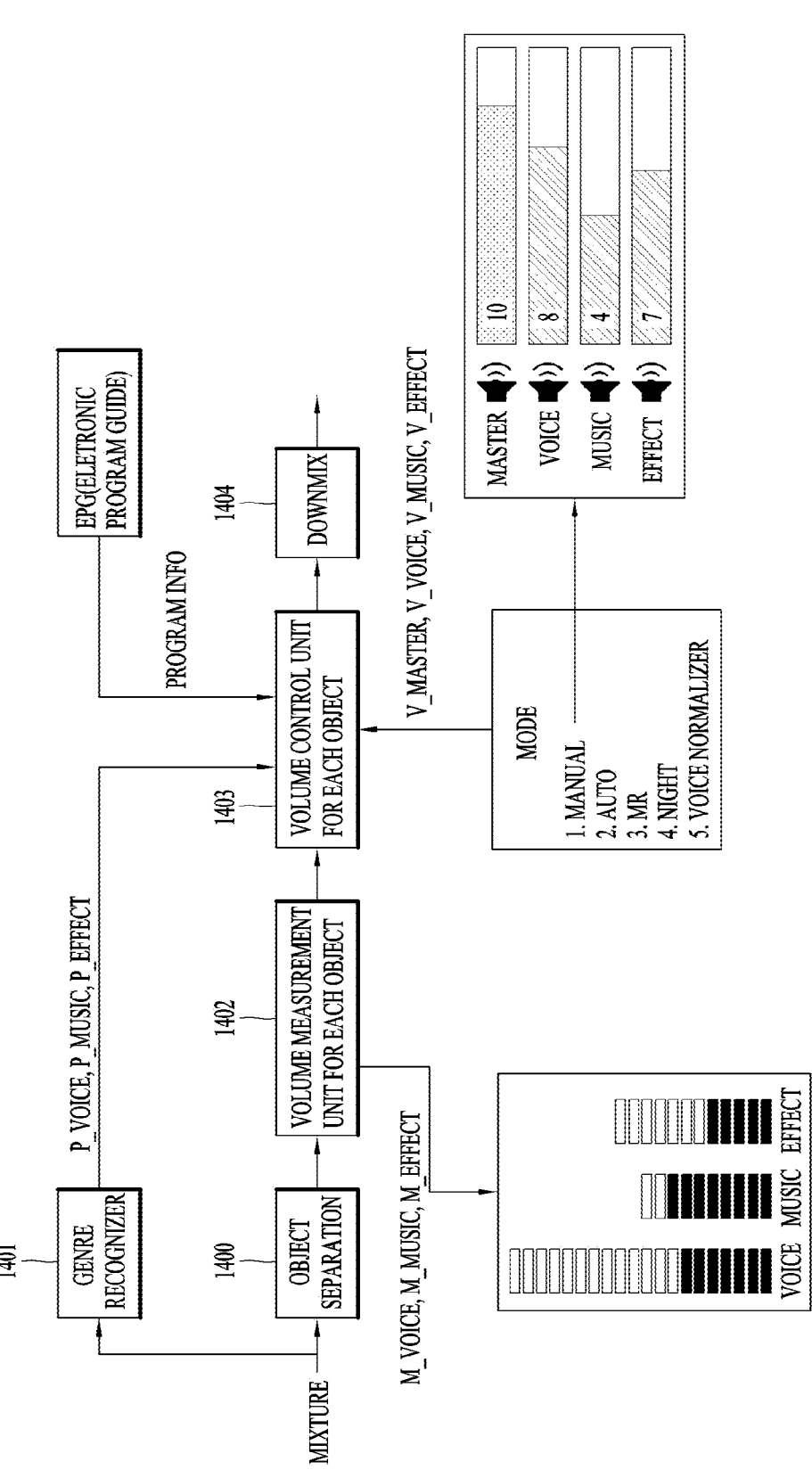
FIG. 14 is a conceptual diagram referenced to a sound control device in accordance with another embodiment of the present disclosure.

FIG. 14 is a conceptual diagram referenced to describe a sound control device in accordance with another embodiment of the present disclosure.

A sound control device in accordance with an embodiment of the present disclosure may include: an outdoor microphone provided on the outside of a vehicle; an indoor microphone provided inside the vehicle; a sound object extraction module 810 extracting at least one audio object from an audio signal received from at least one of the following: the outdoor microphone or the indoor microphone; and a sound object renderer 820 rendering the at least one audio object extracted in the sound object extraction module into audio functions.

In addition, the sound control device in accordance with the embodiment of the present disclosure may include: a genre recognizer 1401 analyzing the received audio signal, categorizing the analyzed audio signal into genres, and generating a probability value for each genre; a volume measurement unit 1402 measuring the magnitude of each of the audio objects extracted in the sound object extraction module and visualizing the measured magnitudes of the audio objects; and a volume control unit 1403 applying different volumes to the audio objects, based on the genres, resulting from the categorization in the genre recognizer.

The sound object module 810 (or 1400) may separate separable audio objects (voice, music, and effect) from the audio signal being input.

The genre recognizer 1401 may analyze a mixture signal being input, categorize the analyzed mixture signal into the current signal's genres (voice, music, and movie) and transfer probability values (P_voice, P_music, and P_effect).

The volume measurement unit 1402 may measure the magnitudes of the separated audio objects (M_voice, M_music, and M_effect) and generate and output (or provide) a user interface visualizing the measured magnitudes of the audio objects.

The user interface may be formed in such a manner as to visualize a real-time volume magnitude and to record a peak value.

In addition, the user interface may be formed in such a manner that, when the volume of each object is adjusted, the peak value is controlled while displaying a current volume real-time magnitude.

The volume control unit 1403 may generate a user interface capable of controlling volume of each extracted audio object.

The audio object may include a voice object, a music object, and an effect sound (effect) object (voice, music, and effect).

With reference to FIG. 14, the volume control unit may provide a plurality of modes, and the plurality of modes may be formed in such a manner that the audio objects are set to different volumes in each of the plurality of modes.

The plurality of modes may include a manual mode, an auto mode, an MR mode, a night mode, a voice normalizer mode, and the like.

The sound control device according to the present disclosure may provide a differentiated operational mode (a functional mode) using the separated (extracted) object.

The manual mode may be a mode that can adjust the volume according to the user's intention.

In a case where music is played using a music playback application or where music listening is in progress (using genre information or information from a genre categorization device), the auto mode may provide a function that does not hinder music listening by avoiding separate voice enhancement.

In addition, the auto mode may be formed in such a manner that, in the other case of a moving image application, or a radio or streaming service, the voice is extracted and enhanced.

The auto mode may provide a function of recognizing information on programs, extracting voice, and improving voice volume normalization and voice clarity. The programs include steaming, dramas, movies, news, and current affairs debates, which are played on radio, terrestrial broadcasting, moving image playback platforms.

The MR mode may provide a function of generating and storing an MR sound source by controlling the voice volume to be close to zero within content configured with voice and music.

The night mode refers to a mode that reduces the magnitude of a signal except for the voice object, thereby enhancing the voice clarity and minimizing the effect sound.

The voice normalizer mode may refer to a mode that compensates for a difference between voice levels within the same content.

Additionally, the voice normalizer mode may include: a mode that compensates for a level between the background sound and the voice within the same content; a mode that compensates for voice level balance across different content within the same service; and a mode that compensates for voice level balance across different content in different services.

In addition, the volume control unit may apply different volumes to objects based on at least one of the following: an operational mode, a genre recognized in the genre recognizer, or electric program guide (EPG) information.

The sound control device 800 according to the present disclosure may further include a down mixer that applies volume to audio for each object and then mixes the resulting audio into a stereo channel.

Figure 15:
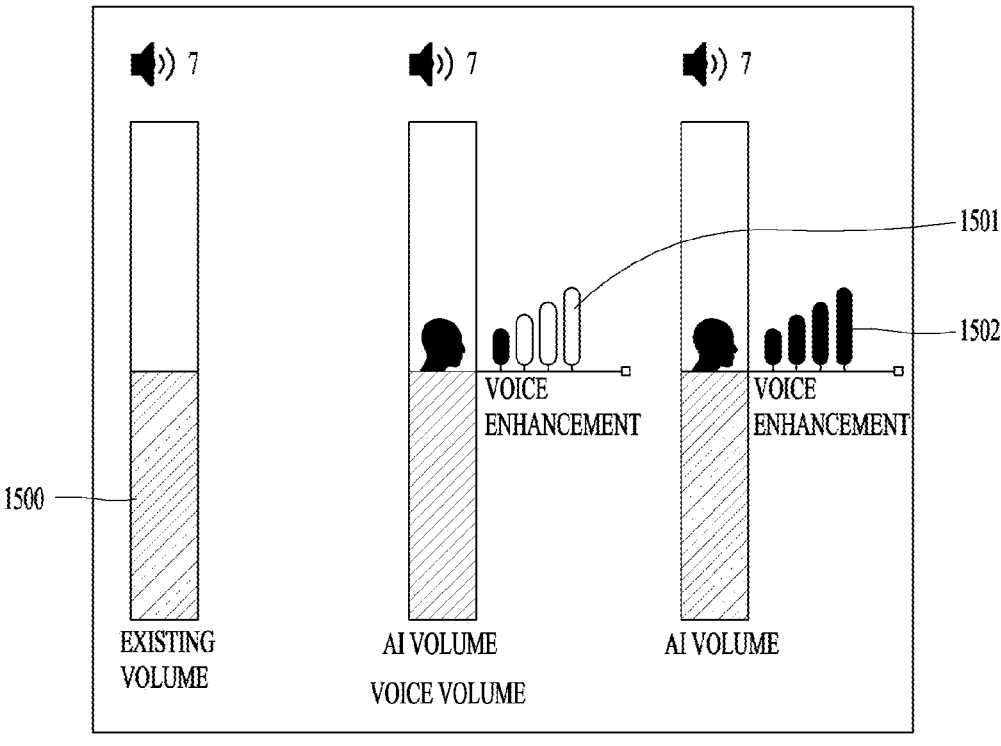
FIG. 15 is a diagram illustrating an interface for executing control of each audio object according to the present disclosure.

FIG. 15 is a diagram illustrating an interface for executing control of each audio object according to the present disclosure.

With reference to FIG. 15, a user interface provided in the sound control device may be the same as the one illustrated in FIG. 15.

The user interface may be formed in such a manner that, when object separation content is played, a content volume control bar 1500 and individually controllable voice volume keys 1501 are separately output.

In a case where the voice normalizer mode is turned on, the user interface may be formed in such a manner that a voice volume key is generated when a cursor is moved to the right while moving an existing volume key either downward or upward. Furthermore, the user interface may be formed in such a manner that the magnitude of voice is adjustable by moving a voice volume in the leftward-rightward direction.

Although not illustrated, when the object separation content is played, a content volume and an individually controllable music volume key or an effect volume key, along with the content volume control bar 1500, may be displayed on the user interface.

The sound control device according to the present disclosure may provide a position-based audio compensation function.

For example, the sound control device may provide a sound focusing function. In the sound focusing function, a mixture sound source, from which system sound (such as navigation guidance voice, warning sound, or the like) or the like is separated, or a sound source separately input with system sound being separated is rendered toward a driver's seat, thereby providing travel information to the driver in a focused manner.

In addition, the sound control device may perform playback by varying playback positions of a plurality of objects based on the user's location.

In addition, the sound control device may also provide a multi-content control mode, a listening environment-adaptive voice volume function, and a voice object-based volume control function. The multi-content control mode separates objects from multi-content and then controls playback according to content with the same attribute and to the priority of each of the objects. In the listening environment-adaptive voice volume function, ambient sound is acquired through a remotely controlled microphone, and the volume of voice is increased when the surroundings are noisy, and background sound is decreased when the surroundings are quiet. In the voice object-based volume control function, through speaker separation, the voices of many persons can be separated, making it possible to control the magnitude of the volume of the voice of each person.

The sound control device according to the present disclosure may provide an optimal audio experience tailored for the situation to the user in various vehicular sound environments.

To this end, the sound control device according to the present disclosure may use AI to separate components of sound originating from inside or outside the vehicle on a per-object basis and analyze their individual characteristics.

In addition, the sound control device according to the present disclosure may provide an intuitive visual interface (I/F) that maps an image object to each sound object.

In addition, the sound control device according to the present disclosure may provide a system capable of dynamically reconfiguring output sound inside the vehicle on the basis of scenarios that vary depending on the situation and the intended usage.

Figure 16:
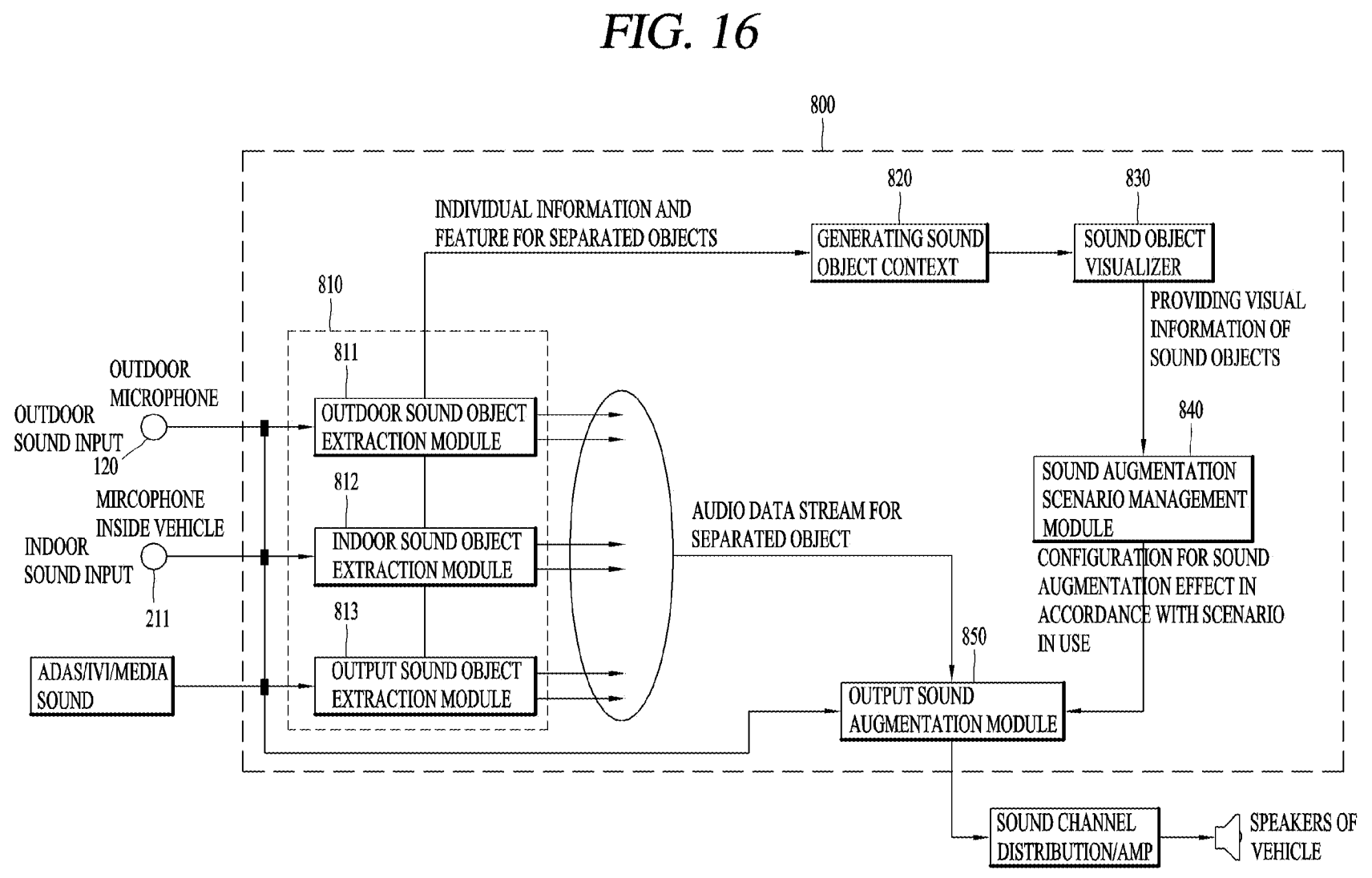
Figure 17:
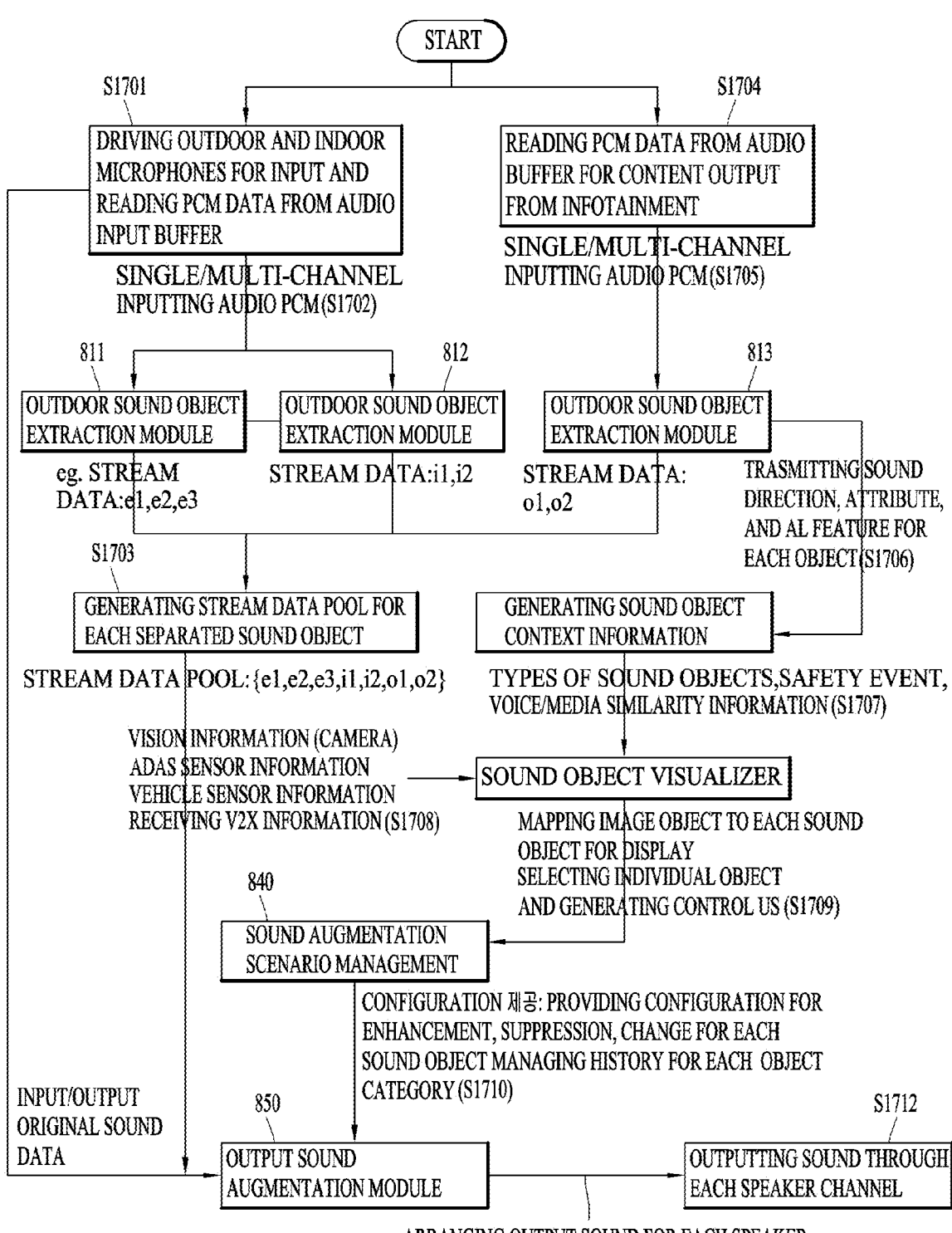
FIG. 17 is a flowchart referenced to describe data flow in the system described with reference to FIG. 16.

FIG. 16 is a conceptual diagram referenced to describe an AI-based vehicular augmentation sound system according to an embodiment of the present disclosure. FIG. 17 is a flowchart referenced to describe data flow in the system described with reference to FIG. 16.

With reference to FIGS. 16 and 17, the sound control device 800 according to the present disclosure may include the sound object extraction module 810. The sound object extraction module 810 may include: an outdoor sound object extraction module 811, an indoor sound object extraction module 812, and an output sound object extraction module 813. The outdoor sound object extraction module 811 extracts an audio object from an audio signal received through the outdoor microphone 120 provided on the outside of a vehicle. The indoor sound object extraction module 812 extracts an audio object from an audio signal received through the indoor microphone 211 provided inside the vehicle. The output sound object extraction module 813 extracts an audio object from an audio signal played on a device (such as an ADAS function or an in-vehicle infotainment system) capable of providing content (media) inside the vehicle.

The sound object renderer 820 described above may generate sound object context information based on at least one of the following: a direction, an attribute, or a feature of sound for each extracted audio object.

The volume measurement unit 1402 described above may include the sound object visualization module 830, which generates a graphic object corresponding to the audio object, using the sound object context information.

The volume measurement unit 1402 may output the graphic object generated in the sound object visualization module 830 to a display (or an IVI system) of the vehicle.

At this point, the sound object visualization module may generate a graphic object that corresponds to the audio object, after incorporating information (for example, vision information sensed from a camera, ADAS sensor information, vehicle sensor information, V2X information, and similar inputs) sensed from sensors provided on the vehicle.

In addition, the sound object visualization module may generate a graphic object, which corresponds to a sound source itself generating an audio signal outside the vehicle, inside the vehicle, or within content (media), after incorporating the information sensed from the sensors provided on the vehicle and may also output the graphic object corresponding to the sound source to the display (or the IVI system) of the vehicle.

When the graphic object described above is selected, the volume control unit 1403 may generate an audio augmentation scenario (or an audio augmentation scenario for a sound source) for an audio object corresponding to the graphic object.

This audio augmentation scenario may be managed or stored by the sound augmentation scenario management module 840 described with reference to FIG. 8, and the sound augmentation scenario management module may be included in the volume control unit 1403.

A plurality of scenarios may be stored in the sound augmentation scenario management module 840. In the plurality of scenarios, a configuration is preset, which determines which audio object is augmented according to the genre recognized in the genre recognizer and to a scenario corresponding to a graphic object.

For example, the audio augmentation scenario may be formed by setting at least one of the following: an object category, an object attribute, a drive function, or a type of sound stream to be processed.

The volume control unit may augment a sound effect corresponding to the audio augmentation scenario based on the audio augmentation scenario.

The augmentation of the sound effect may be performed by the output sound augmentation module 850. The output sound augmentation module 850 may be included in the volume control unit 1403 or be controlled under the control of the volume control unit 1403.

With reference to FIG. 17, the sound control device may drive the indoor and outdoor microphones for input and read PCM data from a sound input buffer (S1701). Furthermore, the sound control device may input audio PCM on a single- or multi-channel into the sound object extraction modules 811 or 812.

As an example, the outdoor sound extraction module 811 may extract a plurality of audio objects e1, e2, and e3. As an example, the indoor sound extraction module 812 may extract a plurality of audio objects i1 and i2.

In addition, as an example, the output sound object extraction module 813 may read PCM data from an audio buffer for content that is output from the infotainment system of the vehicle (S1704) and may input an audio PCM on a single- or multi-channel into the sound object extraction module 813.

As an example, the output sound extraction module 813 may extract a plurality of audio objects o1 and o2.

Subsequently, the sound control device may generate a data pool (e1, e2, e3, i1, i2, o1, o2) for each separated sound object (S1703).

The output sound extraction module 813 may transmit the sound direction, attribute, and feature of the sound of each object to the sound object renderer (S1706), and the sound object renderer may generate a sound object context.

When the sound object content information is generated, the sound object renderer may extract a type of sound object, information on whether or not an event is safe, and voice/media similarity information and may transmit the result of the extraction to the volume measurement unit (specifically, the sound object visualization module) (S1707).

The volume measurement unit (the sound object visualization module) may receive the received information, the information (the vision information, the ADAS sensor information, the vehicle sensor information, and the V2X information) (S1708). Furthermore, the volume measurement unit may generate an image object for each sound object using the measured information and may display the mapped image object on the display (S1709).

In addition, the volume measurement unit (the sound object visualization module) may also generate a user interface capable of selecting and controlling an individual object (S1709).

Subsequently, the sound augmentation scenario management module 840 (or the volume control unit) may provide a configuration for enhancement, suppression, change for each sound object and may manage a history for each object category (S1710).

The output sound augmentation module 850 (or the volume control unit) may receive an audio object pool separated from an original audio (input/output original sound data) and a sound augmentation scenario and may arrange output sound for each speaker to achieve an augmentation effect of a sound object using the audio object pool and the sound augmentation scenario (S1711). Furthermore, the output sound augmentation module 850 may output sound through each speaker channel (S1712).

That is, according to the present disclosure, steps of separating a sound object, generating a sound object context, visualizing the sound object, managing a sound augmentation scenario, and augmenting output sound may be performed.

Specifically, in order to achieve sound object separation through the sound object extraction module, the sound control device may separate components of sound input from outside the vehicle, sound occurring inside the vehicle, and sound originating from a media output on an individual object basis.

The sound control device may generate sound object contexts on an object basis, such as the direction of sound occurrence, position, type, and attribute information of the sound separated through the sound object renderer.

The sound control device may provide a UI that, through the volume measurement unit (or the sound object visualization module) using the camera or similar device, recognizes many image objects, maps sound objects to these image objects, and visually displays and selectively controls the mapping results.

Through the volume control unit (or the sound augmentation scenario management module), the sound control device may perform sound augmentation scenario selection and configuration according to the situation and the user's settings, and may manage previous history or perform automation.

Through the volume control unit (or the output sound augmentation module), the sound control device may apply enhancement or deletion, a sound image (3D) change, and an additional effect to each sound object selected according to a scenario configuration.

Various embodiments of the present disclosure for sound augmentation are described in more detail below with reference to the accompanying drawings.

FIGS. 18, 19, 20, 21, 22, and 23 are conceptual diagrams illustrating practical examples where the sound control device according to the present disclosure augments sound in each situation.

The sound control device may perform selective control on many outdoor sound objects.

Figure 18:
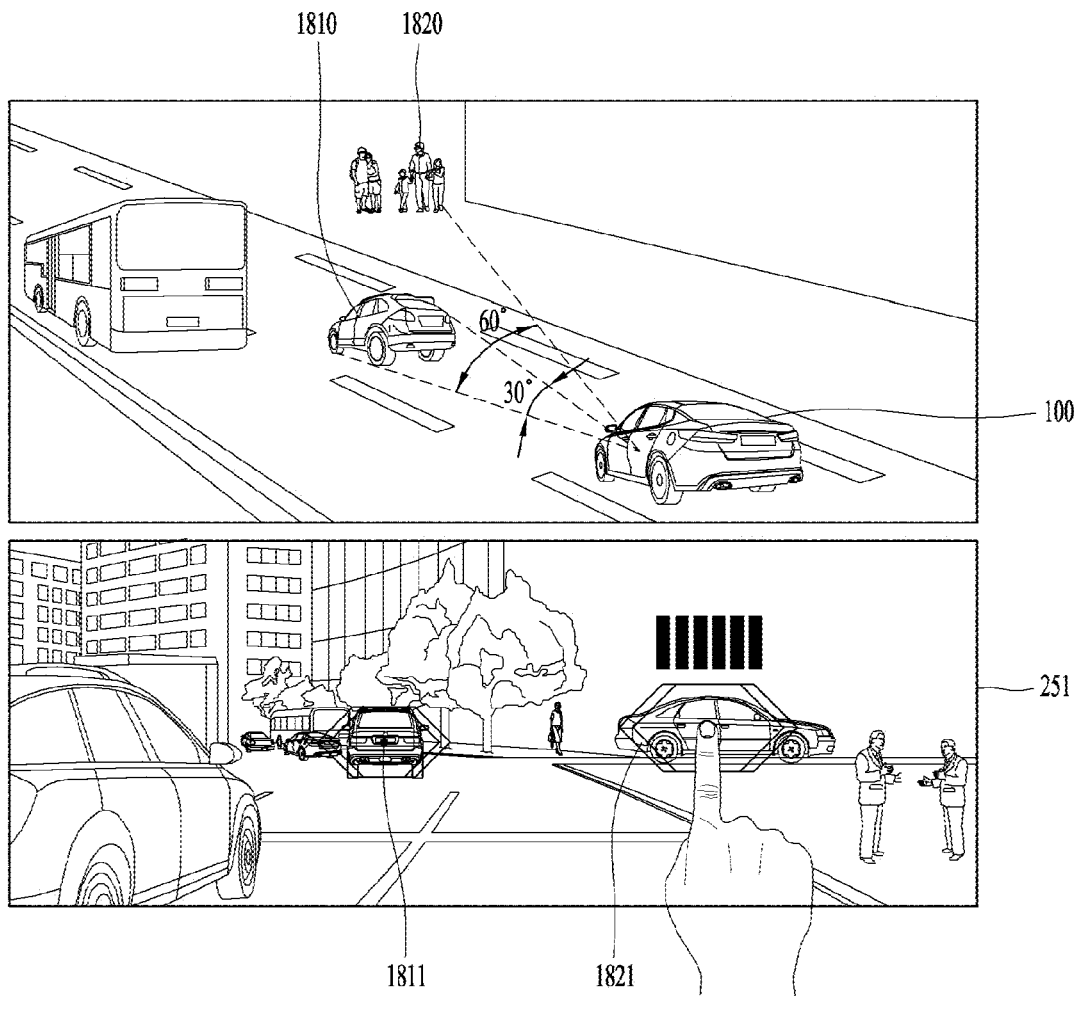
FIGS. 18, 19, 20, 21, 22, and 23 are conceptual diagrams illustrating practical examples, respectively, where the sound control device according to the present disclosure augments sound in each situation.

With reference to FIG. 18, in some cases, the sound of a nearby vehicle, sound from a construction site, and sound from an event on a street may be heard while the vehicle comes to a stop.

In this case, the sound control device may extract object separation 1810 or 1820 and attribute information from external sound.

For example, regarding the attribute information, a first attribute e1 may refer to {outdoors, 30 degrees to the right ahead} and a second attribute e2 may refer to {outdoors, 60 degrees to the right ahead}.

The sound control device may generate the sound object context information using a dynamic table, after determining a type and a category through attribute information and feature data, which are obtained from an object separation module.

For example, the sound object context information may be generated in the form of outdoor construction sound (drill sound, noisy-level volume, 30 degrees to the right ahead), outdoor street sound (event music or voice, middle-level volume, 60 degrees to the right ahead), and the like.

The sound object visualization module may detect at least one external image (graphic) object based on information from the camera, map the corresponding location information to the sound object context information, and provide visualized feedback 1811 or 1821 to the user.

For example, the volume control unit may start a scenario where internal user sound for the corresponding object is reduced through touch on a specific image object (a construction site).

Specifically, the sound augmentation scenario management module may generate a new sound augmentation scenario at the request of the user. The scenario may include contents such as (scenario A=outdoors, specific sound object, noise reduction request).

In addition, the sound augmentation scenario management module may generate and transfer a configuration in which augmentation sound AI can operate in accordance with the corresponding scenario.

The contents of the scenario may include an object category (outdoor short-distance periodic noise), an object attribute (30 degrees to the right ahead, low-band noise), a drive function (an active noise canceller operation), selection of sound stream to be processed (separated outdoor sound stream e1 (+ outdoor microphone original sound), indoor reference microphone original sound).

The output sound augmentation module may select and input necessary sound data streams according to the configuration and may drive a parameter (AI parameter) suitable for the corresponding function (reconfiguration of indoor output sound components in such a manner as to reduce drill noise from a construction site ahead).

In a case where a source of the audio signal is unidentified from an image received through the camera, the volume control unit may also output a graphic object, visualized in such a manner that the source of the audio signal is identifiable, on the display of the vehicle.

Figure 19:
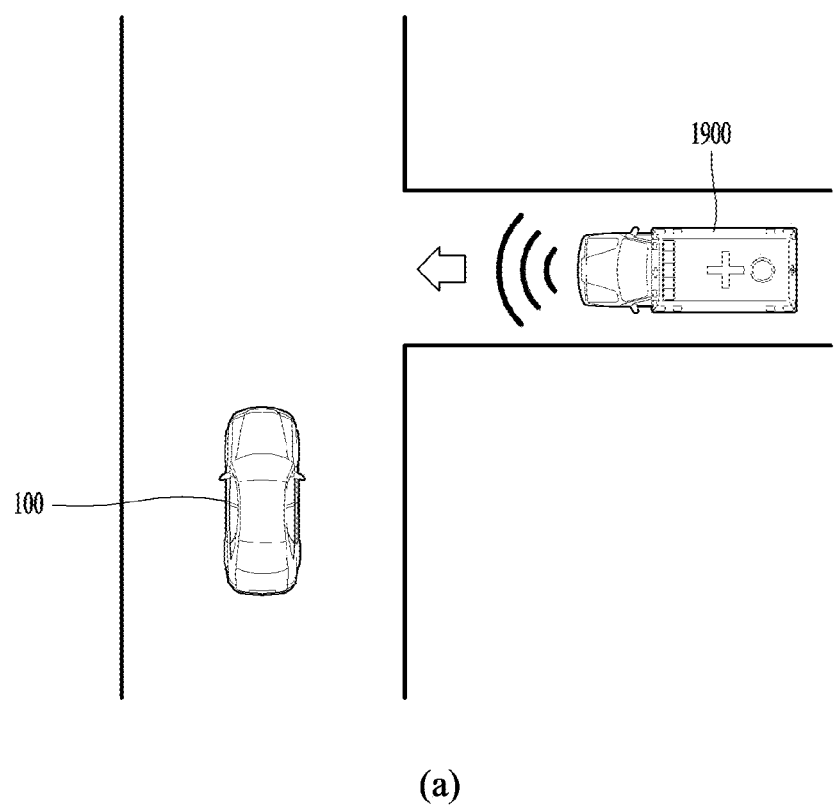
Figure 19:
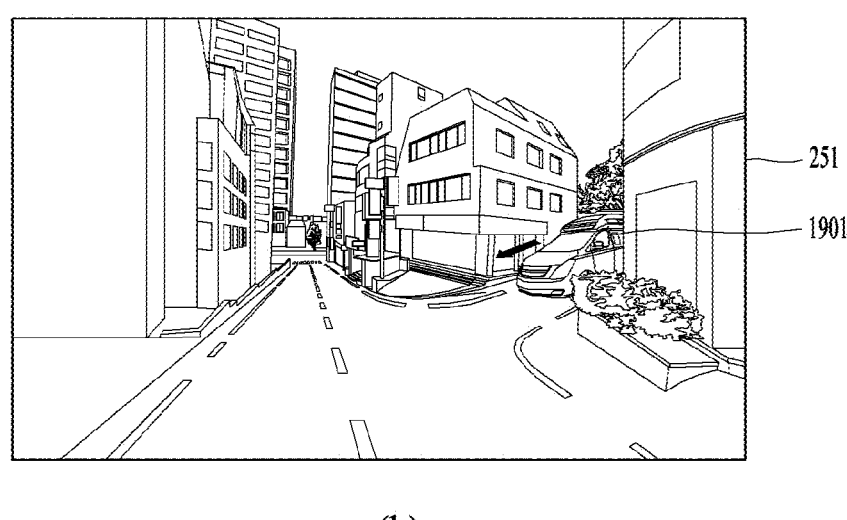

With reference to FIG. 19, the sound control device according to the present disclosure may provide sound event information for a quadrangular area and augment a noise effect.

For example, as illustrated in (a) of FIG. 19, in some cases, sound (for example, siren sound) associated with safety may be output within a quadrangular zone to the right ahead.

In this case, through the object separation module, the sound control device may separate objects from external sound and extract various attribute information therefrom (stream data e1, attribute={outdoors, x-degree direction to the right head, where x is extracted every second).

Subsequently, to generate sound object context information, the sound control device may generate a dynamic table after determining a type and a category through the attribute information and the feature data, which are obtained from the sound extraction module (outdoors, siren noise, noisy-level volume, x-degree to the right ahead).

Through the sound object visualization module, using the sound object context information, the sound control device may map a virtual graphic object to a suitable position on image information obtained from the camera or on map information and may provide visualized feedback (start a scenario where, by touching the corresponding object (an ambulance), the relative position of the corresponding sound object is accentuated more visibly using internal user sound).

The sound control device may generate a new sound augment scenario through the sound augment scenario management module (scenario B=outdoors, specific sound object, 3D effect augmentation).

In addition, through the sound augment scenario management module, the sound control device may generate and transfer a configuration in which the augmentation sound AI can operate in accordance with the corresponding scenario (object category=outdoor remote-distance persistent noise, safety information, object attribute=x degrees to the right ahead, low-band noise, drive function=3D sound, selection of sound stream to be processed=separated outdoor sound stream e1 (+outdoor microphone original sound).

In addition, the sound control device may manage the history of augmented safety-associated sound (siren). Consequently, the sound control device may also perform UI automation later, thereby providing convenience.

Through the output sound augmentation module, the sound control device may reconfigure indoor output sound components in such a manner that siren noise location information is made distinct according to the scenario configuration.

In a case where the sound control device ascertains information on an object in a quadrangular zone through V2X, ADAS, or a similar technology and where an external noise level is not sufficiently high, the sound control device may virtually generate the sound object context information. Furthermore, the IVI system may generate the original sound of the corresponding object and intuitively provide information on the location of the object within the quadrangular zone. Additionally, the volume control unit may also output a graphic object 1901, which corresponds to information on the object, to the display of the vehicle.

In addition, in a case where external noise, like collision sound, is a single occurrence, the sound control device may output additional detailed information through V2X or a similar technology when the corresponding object is selected in Step 3.

When outputting a guidance sound or an advertisement for a place of interest from the infotainment system included in the vehicle, the volume control unit may control speakers of the vehicle in such a manner that sound is output through a speaker positioned at a place corresponding to a location of the place of interest.

Figure 20:
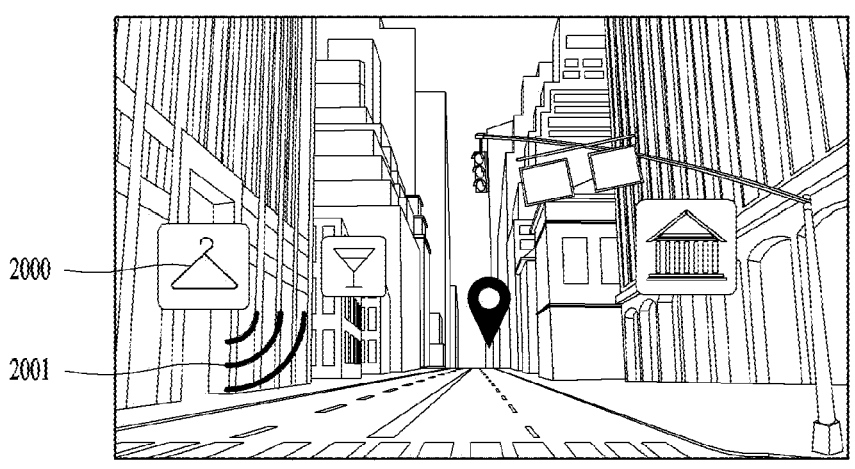

For example, as illustrated in FIG. 20, the sound control device may augment IVI output sound for providing information.

For example, in some cases, guidance sound or an advertisement that is registered for a specific POI 2000 may be output from the in-vehicle infotainment (IVI) system.

Through the sound object extraction module, the sound control device may perform object separation on IVI output sound, separating the IVI output sound into voice and background music and extract various attribute information therefrom (stream data o1, attribute={IVI, sound}, stream data o2, attribute={IVI, music}).

The sound control device may generate the sound object context information using the dynamic table, after determining the type and the category through the attribute information and the feature data, which are obtained from the object separation module (IVI output, POI guidance voice, intermediate level volume IVI output, background music, and intermediate level volume).

Using the sound object context information and information on the relative locations of the vehicle and the POI, the sound control device may map a virtual graphic object to a suitable position on an image from the camera or on map information and may provide visualized feedback 2001 to the user (start a scenario where, by touching the corresponding object (a virtual banner), the relative location of the host vehicle is accentuated more visibly using voice guidance for the POI).

The sound control device may generate a new sound augmentation scenario through the sound augmentation scenario management module (scenario C=indoors, specific IVI guidance sound, 3D effect augmentation).

Subsequently, the sound control device may transfer a configuration in which the augmentation sound AI can operate in accordance with the corresponding scenario (object category=IVI POI guidance voice, object attribute=x degrees to the right ahead, wide band, drive function=3D sound, selection of sound stream to be processed=separated sound stream o1+o2).

In a case where safety-associated sound (safety sound) is output, the sound control device may temporarily manage scenario priorities, such as managing the timing for guidance voice delay output or muting general media sound during the guidance sound.

Through the output sound augmentation module, according to a configuration, the sound control device may apply a 3D sound effect augmentation effect (to o1) in such a manner that the user feels if he/she is receiving direct voice guidance from the location of the POI, accompanied by uniform background music (o2).

The sound control device may use an IVI output sound augmentation effect under various situations.

For example, when the vehicle approaches the vicinity of the POI selected as a destination, the IVI system may automatically start to provide guidance to the driver (recognizing the location of the POII when the POI is hidden behind a building).

In addition, the sound control device may output secondary guidance sound by recognizing through ADAS or a similar technology that the vehicle enters a parking lot in a building in which the POI is located (in a case where the POI is on the same floor as the parking lot, the distance to the POI can be recognized without needing to checking which floor the POI is located on).

In addition, in a case where the user wants to know information about a restaurant in the vicinity of the current location of the vehicle or brief information about the POI (a museum) while on the road, the sound control device may transfer the advertisement or the information only in a short distance to the restaurant or the POI in a disturbed and natural manner at the necessary moment.

In addition, in a case where voice tagging, along with an AR display function, is used at a specific position, the sound control device can create a virtual effect of guiding the vehicle at the memo position (the same effect as when a parking attendant provides specific information in advance to the entering vehicle at a gate to a parking lot).

When it is detected that the driver of the vehicle sings along with music being output in the vehicle, the volume control unit may reduce vocal sound in the music, apply an audio effect to the driver's voice, and output the resulting driver's voice through the speakers.

Figure 21:
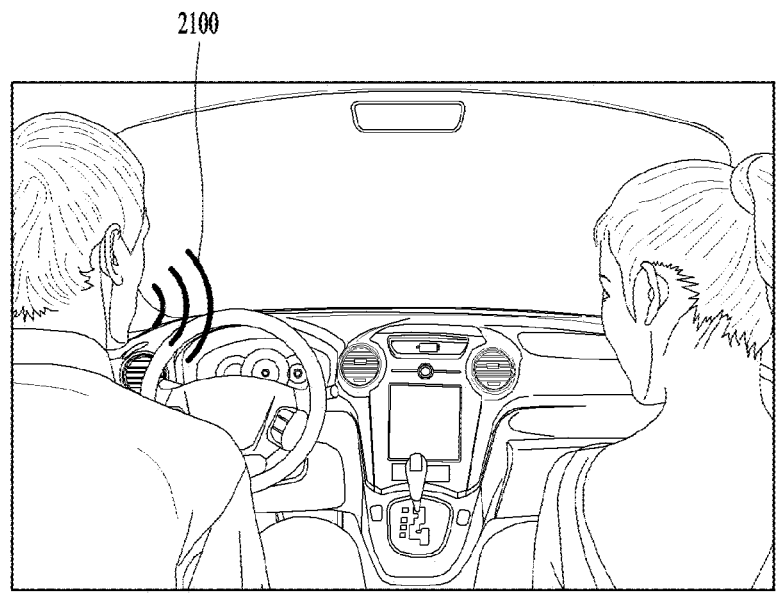

As illustrated in FIG. 21, a case 2100 may occur where the user is singing along with the music played in the IVI system.

In this case, the sound control device may perform object extraction and attribute information extraction on the IVI output sound, separating the IVI output sound into voice and background music (stream data o1, attribute={IVI, radio, voice}: stream data o2, attribute={IVI, radio, music}, separation of voice object from indoor microphone sound, stream data i1, attribute={indoors, voice, in driver's seat direction}).

The sound control device may generate the sound object context information (IVI output: main vocal voice, intermediate-level volume; IVI output: instrument music, intermediate-level volume; and indoor driver song voice: high-level volume, high similarity to IVI output main vocal).

Using the sound object context information, the sound control device may apply seat-based mapping to an indoor vehicle picture and provide visualized feedback 2200 on the position at which the driver is singing (start a scenario where, by touching the corresponding seat, an optimal karaoke effect is applied to the voice from the corresponding position).

The sound control device may generate a new sound augmentation scenario (scenario D=indoors, radio sound, indoor karaoke mode) and transfer a configuration in which the augmentation sound AI can operate in accordance with the corresponding scenario (object category=radio main vocal, music, passenger's voice, object attribute=driver's seat direction, wide band, drive function=reduction in radio main vocal volume, enhancement of echo to be applied to voice in the direction of the driver, selection of sound stream to be processed=separated sound stream i1, o1, o2).

According to the configuration, the sound control device may apply the effect of augmenting an echo effect to a combination of combination of radio music (o2), reduced vocal sound (o1), and driver's singing.

According to travel regulations and drive safety, the sound control device may determine whether or not output is enabled and adjust the output form. Particularly, when safety-associated sound (safety sound) is input, the sound control device may reduce the karaoke effect and enhance the corresponding alarm or sound, thereby transferring the safety-associated sound to only the driver.

In a state where music is played in the vehicle, in a case where navigation path guidance is output, the volume control unit may reduce the vocal sound in the music being played and increase volume of the navigation path guidance.

Figure 22:
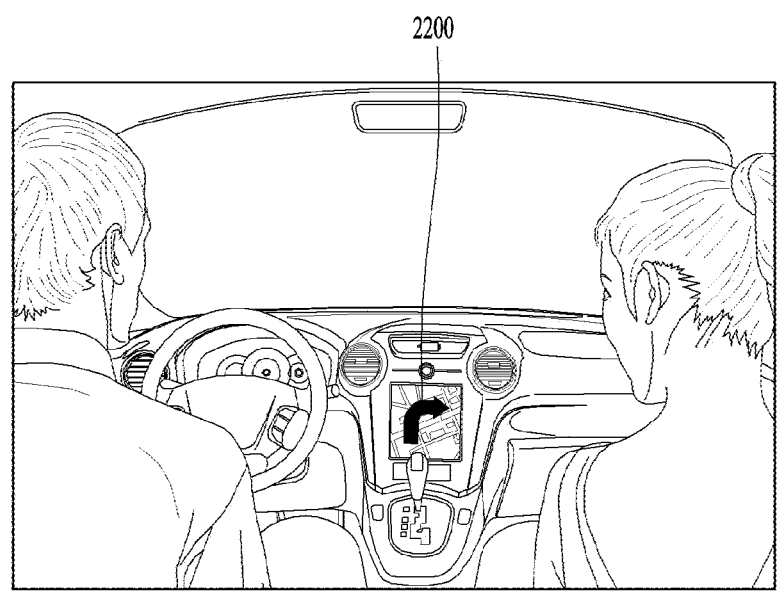

With reference to FIG. 22, in some cases, path guidance may be performed during radio or music playback in the in-vehicle infotainment (IVI) system.

In this case, the sound control device may perform object extraction (stream data o1, attribute={IVI, radio, voice}, stream data o2, attribute={IVI, radio, music}, stream data o3, attribute={IVI, navigation voice}).

Subsequently, the sound control device may generate the sound object context information (IVI output, main vocal voice, intermediate-level volume, IVI output, instrument music, intermediate-level volume, IVI output, navigation voice, intermediate-level volume).

The sound control device may provide visualized feedback on a position at which navigation guidance voice 2200 is output and generate a sound augmentation scenario (scenario D=indoors, radio sound, navigation path guidance).

The sound control device may generate and transfer a configuration in which the augmentation sound AI (the volume control unit) can operate in accordance with the scenario (object category=radio main vocal, music, navigation guidance voice, object attribute=driver's seat direction, wide band, drive function=radio main vocal volume reduction or removal, selection of sound stream to be processed=separated sound stream o1, o2, o3).

According to the configuration, the sound control device may augment a combination of radio music (o2), reduced (or removed) vocal sound (o1), and navigation guidance voice (o3).

The sound control device may remove a voice object (a vocal sound) from radio or streaming audio (or adjust a voice object to an extremely low level) in such a manner that the path guidance voice is clearly audible to the driver.

In addition, sound output may be configured in such a manner that the path guidance sound and the reduced voice object (vocal sound) are limited to the driver (the speakers of the vehicle are controlled in such a manner that the voice object is audible at its original volume to other users.

The volume control unit may receive, from the vehicle, information on whether or not the vehicle deviates to the left or the right from a lane along which the vehicle travels, and vary left and right volume balance of sound which is output through the speakers of the vehicle, based on a direction toward which the vehicle deviates.

For example, the sound control device may use media sound balance to remind the driver of safety drive guidance and maintain his/her attention.

Figure 23:
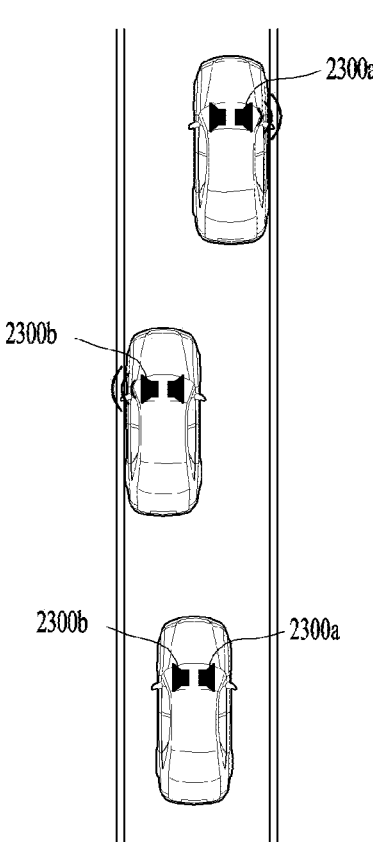

For example, with reference to FIG. 23, for safety drive guidance, the sound control device may use the media sound balance when visibility is poor, such as when the vehicle travels at night on a rainy day or in foggy conditions, or when the vehicle is in a waiting state before transitioning from autonomous traveling to manual traveling.

The sound control device may categorize the IVI output sound into objects with a sound image in the center and objects with a sound image to the left or the right (stream data o1, attribute={IVI, voice, central}, stream data o2, attribute={IVI, instrument 1, left], stream data o3, attribute={IVI, instrument 2, right}).

The sound control device may generate the sound object context information using the attribute information and the feature data (IVI output, main vocal, center, immediate-level volume, IVI output, electronic guitar, left, immediate-level volume, IVI output, electronic piano, right, immediate-level volume).

Through the sound object visualization module, the sound control device may display information on the relative locations of the vehicle and the lane thereof on a cluster travel information screen, using information from ADAS and sensors. At this time, when the vehicle starts to deviate to the left from the lane without turning on a signal indicator, the sound control device may visualize and display an alarm indicating the proximity to the border of the line.

For example, when a media sound balance function for safety is in a state of being set to be turned on, the sound control device may display the extent to which the sound deviates to the left (2300*a* and 2300*b*) and start a sound balance adjustment scenario (scenario E=indoors, media balance distortion, lane maintenance guidance).

The sound control device may transfer a configuration in which the augmentation sound AI can operate in accordance with the corresponding scenario (object category=media main vocal, left-side instrument, right-side instrument, object attribute=wide band, drive function=distorted 3D sound+lane border sound, selection of sound stream to be processed=separated sound stream o1+o2+o3).

When a vehicle door is open, a 3D sound effect is attenuated due to noise. For this reason, the sound control device can improve a user experience (UX) by turning off the function. According to the configuration, the sound control device may create a gradual change that the driver perceives in a natural and intuitive manner by performing the balance distortion as follows. Based on the extent to which the vehicle deviates to the left from the lane, central main vocal (o1) is gradually heard from the right, the left-side electronic guitar (o2) is perceived as if it is close to the ears, and the right-side electronic piano is perceived as if it is coming from a distant place.

When the vehicle travels close to the edge of the lane, the sound control device may alert the user by generating a persistent noise similar to the sound produced when the vehicle crosses the lane border, helping the driver stay aware of the vehicle's position within the lane.

When the vehicle deviates to one side from the center of the lane, the sound control device may alert the user to this deviation by appropriately harmonizing the media sound left/right volume balance effect with imaginary line border sound.

When the vehicle maintains the center of the lane, the sound control device may restore the media sound left/right volume balance to its original state and may stop the lane border sound.

According to the embodiments of the present disclosure, one or more effects are provided as follows.

Firstly, according to the present disclosure, there can be provided a novel sound control device capable of recognizing sound inside and outside a vehicle as units of individual objects, and controlling them independently and a method of controlling the novel sound control device.

Secondly, according to the present disclosure, there can be an intuitively visualized interface that helps a user understand a situation quickly and perform control intuitively.

Thirdly, according to the present disclosure, by coupling various sensors to the vehicle, a situation associated with sound inside and outside the vehicle's cabin can be determined, and control scenarios can be managed.

Fourthly, according to the present disclosure, an augmentation-type user experience (UX) that is different from the existing one can be provided by reprocessing and optimizing indoor output sound.

Fifthly, according to the present disclosure, in the vehicle's operating environment, many internal or external sounds can be controlled at an individual object level, thereby providing an optimized augmented sound experiment.

The effects of the present disclosure may not be limited to those effects mentioned above, and other effects not mentioned may be clearly understood by those skilled in the art from the description of the appended claims.

All constituent elements included in the sound control device described above may be independent constituent elements, but they are not limited thereto. They may also be software-realized components.

The present disclosure described above can be implemented as computer-readable codes on a program-recorded medium. The computer readable medium includes all kinds of recording devices in which data readable by a computer system is stored. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer may include a processor or a controller. Therefore, the detailed description should not be limitedly construed in all of the aspects, and should be understood to be illustrative. The scope of the present disclosure should be determined by rational interpretation of the appended claims, and all changes within the scope of equivalents of the present disclosure are included in the scope of the present disclosure.

What is claimed is:

1. A sound control device comprising:
an outdoor microphone provided outside a vehicle;
an indoor microphone provided inside a vehicle;
a sound object extraction module for extracting at least one audio object from an audio signal received from at least one of the outdoor microphone and the indoor microphone; and
a sound object renderer for generating sound object context information based on at least one of the direction, property, and characteristic of the sound of each audio object extracted from the sound object extraction module;
a sound object visualization module for recognizing a plurality of image objects from an image of the outside of the vehicle acquired through a camera of the vehicle, mapping the extracted audio objects to the image objects through the sound object context information, and providing visualized feedback for the image objects to which the audio objects are mapped; and,
a volume control unit for amplifying or reducing an audio object mapped to a specific image object among the audio signals received from at least one of the outdoor microphone and the indoor microphone according to a user's request using the visualized feedback.

2. The sound control device of claim 1, wherein the sound object extraction module comprises:
a feature embedding module configured to extract a feature vector of the audio object;
a feature extraction module configured to extract features to be used as input to a deep neural network; and
a synthesizer configured to synthesize an audio signal using a result value predicted from the features input into the deep neural network.

3. The sound control device of claim 2, wherein the sound object extraction module further comprises:
a separation module configured to separate a specific object from an original signal, using information extracted in the feature embedding module and an input feature.

4. The sound control device of claim 3, wherein the separation module separates different types of objects according to a type of the feature vector input in the feature embedding module.

5. The sound control device of claim 2, wherein the feature extraction module learns weights of the deep neural network using predefined input data and output data.

6. The sound control device of claim 2, wherein the feature extraction module extracts the features at least using one of the following: a time domain technique or a frequency domain technique.

7. The sound control device of claim 6, wherein the time domain technique extracts the features by altering a sampling rate value of an input signal through up-sampling or down-sampling.

8. The sound control device of claim 6, wherein the frequency domain technique performs conversion into a frequency domain signal by performing a Short-Time Fourier Transform (STFT) and extracts the features using a frequency band based on a person's hearing characteristics.

9. The sound control device of claim 1, wherein the sound object renderer comprises:
a voice normalizer configured to normalize voice to a target magnitude;
an auto volume module configured to normalize a magnitude of an original sound signal to a target magnitude; and a voice mixer configured to mix a voice signal, resulting from the normalization in the voice normalizer, with a sound signal, resulting from the normalization in the auto volume module.

10. The sound control device of claim 9, wherein the voice normalizer comprises:

a perceptual weighting filter configured to delete a band unrelated to the voice signal and to emphasize a band of a person's voice signal;

a pre-processing module configured to extract data for calculating a gain from the voice signal in each frequency band;

a power estimation module configured to estimate average power of the voice over a predetermined time;

a gain calculation module configured to calculate a gain using the estimated average power of the voice and the target magnitude of the voice; and a gain application module configured to acquire the voice signal having magnitude resulting from normalization by multiplying the voice signal by the calculated gain.

\* \* \* \* \*